(12) United States Patent　　(10) Patent No.: US 11,914,363 B2
Oda et al.　　(45) Date of Patent: Feb. 27, 2024

(54) MOBILE ROBOT, TRANSPORT SYSTEM, METHOD, AND COMPUTER-READABLE MEDIUM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/544,190

(22) Filed: Dec. 7, 2021

(65) Prior Publication Data

US 2022/0260992 A1　Aug. 18, 2022

(30) Foreign Application Priority Data

Feb. 17, 2021　(JP) ................ 2021-023101

(51) Int. Cl.
　　*G05D 1/00*　　(2006.01)
　　*G05D 1/02*　　(2020.01)
(52) U.S. Cl.
　　CPC ......... *G05D 1/0022* (2013.01); *G05D 1/0297* (2013.01)

(58) Field of Classification Search
　　CPC .................... G05D 1/0022; G05D 1/0297
　　See application file for complete search history.

(56) References Cited

U.S. PATENT DOCUMENTS

2020/0264630 A1*　8/2020　Sakurada ............. G05D 1/0223

FOREIGN PATENT DOCUMENTS

| JP | 2006007341 | * | 1/2006 |
| JP | 2007249735 A | | 9/2007 |
| JP | 2020181434 A | | 11/2020 |

OTHER PUBLICATIONS

JP2006007341 A machine translation (Year: 2006).*
JP2006007341Amachinetranslation(Year:2006) (Year: 2006).*

* cited by examiner

*Primary Examiner* — Anne Marie Antonucci
*Assistant Examiner* — Jingli Wang
(74) *Attorney, Agent, or Firm* — Dickinson Wright, PLLC

(57) ABSTRACT

A mobile robot receives first transmission information transmitted from a server device to manage the mobile robot in a state where wireless communication with the server device is possible, directly executes wireless communication with another mobile robot among the mobile robots and executes a reception process of receiving the first transmission information transmitted from the server device to manage the mobile robot from the other mobile robot in a case where wireless communication with the server device is not possible.

12 Claims, 7 Drawing Sheets

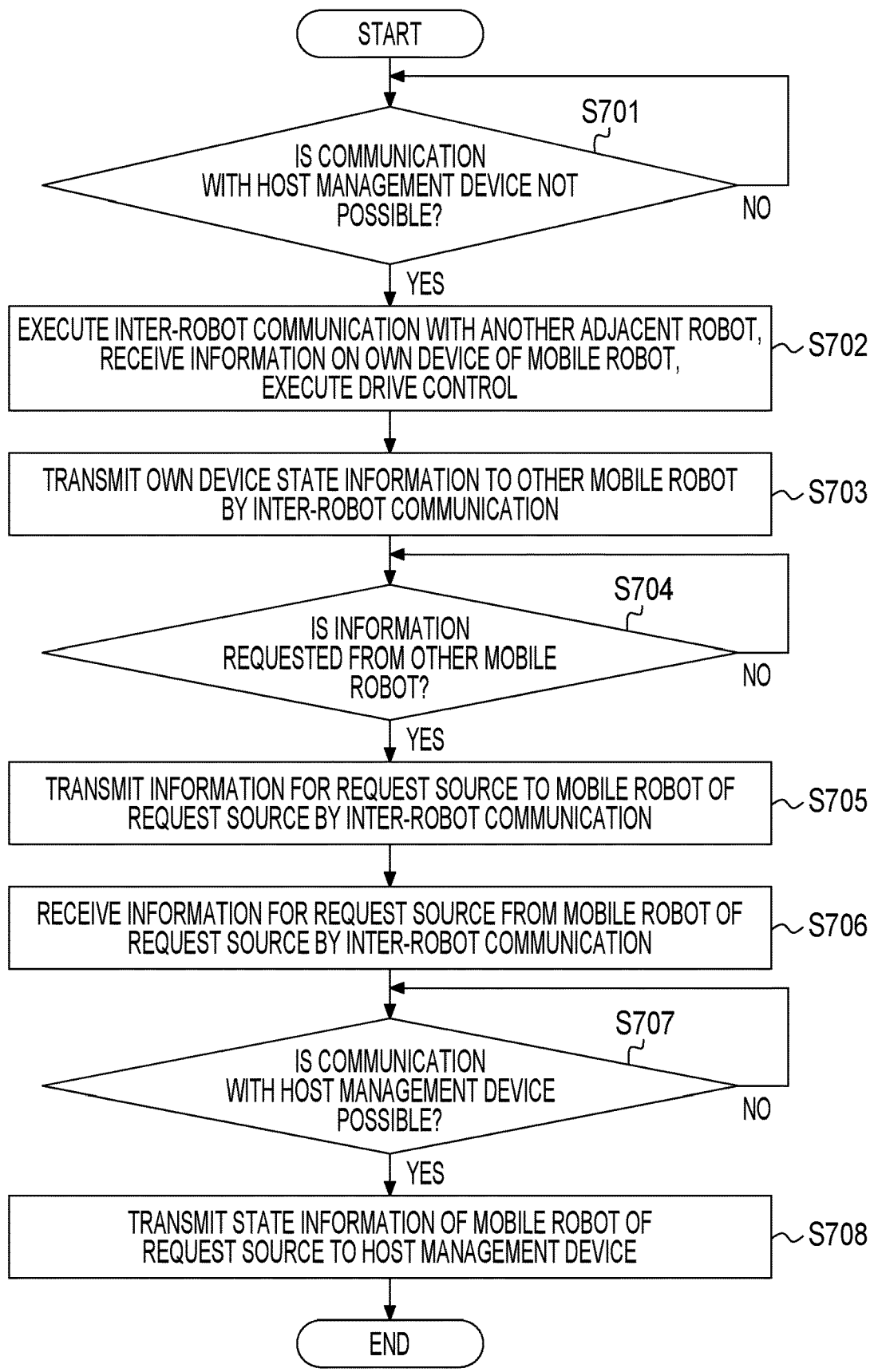

MOBILE ROBOT, TRANSPORT SYSTEM, METHOD, AND COMPUTER-READABLE MEDIUM

CROSS-REFERENCE TO RELATED APPLICATION

This application claims priority to Japanese Patent Application No. 2021-023101 filed on Feb. 17, 2021, incorporated herein by reference in its entirety.

BACKGROUND

1. Technical Field

The present disclosure relates to a mobile robot, a transport system, a method, and a computer-readable medium.

2. Description of Related Art

Japanese Unexamined Patent Application Publication No. 2007-249735 (JP 2007-249735 A) discloses the technology that in a robot that autonomously travels in a predetermined area, in a case where an error occurs and own position of the robot and an orientation are lost, the own position of the robot is grasped by reading an RFID tag installed in a traveling area by a reader or capturing a landmark by a robot-mounted camera.

SUMMARY

The present inventors have developed the technology for receiving information, such as a position or an instruction, by wireless communication with a server in a mobile robot that autonomously travels inside a facility or a predetermined area of the facility. Above all, the present inventors have examined a case where wireless communication with the server is interrupted due to a fire or an earthquake.

In a case where wireless communication with the server is interrupted, the mobile robot cannot receive the information, such as the position or the instruction, from the server, so that countermeasures are needed. In a case where the mobile robot is used to transport a transport object, the transport object may not be able to be transported unless the above problem is solved.

In the technology disclosed in JP 2007-249735 A, since solely positional information can be grasped and the instruction or the like given to the mobile robot cannot be grasped, it is difficult to continue to execute an instructed work, as well as the installation of the RFID tag or the landmark is needed for grasping the positional information.

The present disclosure is to provide a mobile robot that, in a transport system that transports a transport object by using a plurality of mobile robots that can autonomously move inside a facility, can receive information needed for management even in a case where wireless communication with a server device that manages the mobile robot is not possible, a transport system, a method, and a computer-readable medium.

A first aspect of the present disclosure relates to a mobile robot in a transport system including a server device configured to exchange information with a plurality of the mobile robots that is autonomously movable inside a facility by wireless communication and manage the mobile robots and transporting a transport object by using the mobile robots. The mobile robot is configured to receive first transmission information transmitted from the server device to manage the mobile robot in a state where wireless communication with the server device is possible. The mobile robot is configured to directly execute wireless communication with another mobile robot among the mobile robots and execute a reception process of receiving the first transmission information transmitted from the server device to manage the mobile robot from the other mobile robot in a case where wireless communication with the server device is not possible. With such a configuration, the mobile robot can receive information needed for management even in a case where wireless communication with the server device is not possible.

A second aspect of the present disclosure relates to a mobile robot in a transport system including a server device configured to exchange information with a plurality of the mobile robots that is autonomously movable inside a facility by wireless communication and manage the mobile robots and transporting a transport object by using the mobile robots. The mobile robot is configured to receive first transmission information transmitted from the server device to manage the mobile robot and second transmission information transmitted from the server device to manage another mobile robot among the mobile robots in a state where wireless communication with the server device is possible. The mobile robot is configured to directly execute wireless communication with the other mobile robot and execute a transmission process of transmitting the second transmission information to the other mobile robot in a case where wireless communication of the other mobile robot with the server device is not possible. With such a configuration, the other mobile robot can obtain the information needed for management even in a case where wireless communication with the server device is not possible.

A third aspect of the present disclosure relates to a transport system comprising a server device configured to exchange information with a plurality of mobile robots that is autonomously movable inside a facility by wireless communication and manage the mobile robots. The transport system transports a transport object by using the mobile robots. The mobile robot is configured to receive first transmission information transmitted from the server device to manage the mobile robot and second transmission information transmitted from the server device to manage another mobile robot among the mobile robots in a state where wireless communication with the server device is possible. The other mobile robot is configured to receive the first transmission information and the second transmission information in a state where wireless communication with the server device is possible. The mobile robot is configured to directly execute wireless communication with the other mobile robot, receive the first transmission information from the other mobile robot, and execute a first communication process of transmitting first positional information indicating a position of the mobile robot to the other mobile robot in a case where wireless communication with the server device is not possible. The other mobile robot is configured to directly execute wireless communication with the mobile robot, receive the second transmission information from the mobile robot, and execute a second communication process of transmitting second positional information indicating a position of the other mobile robot to the mobile robot in a case where wireless communication with the server device is not possible. The other mobile robot is configured to transmit the first positional information received in the first communication process to the server device in a state where wireless communication with the server device is possible. The mobile robot is configured to transmit the second positional information received in the second communication process to the server device in a state where wireless communication with the server device is possible. The server device is configured to search for the mobile robot based on the first positional information in a case where wireless communication with the mobile robot is not possible. The server device is configured to search for the other mobile robot based on the second positional information in a case where wireless communication with the other mobile robot is not possible. With such a configuration, in the transport system, it is possible to search for the mobile robot or the other mobile robot in which wireless communication with the server device is not possible.

A fourth aspect of the present disclosure relates to a method for a mobile robot in a transport system including a server device configured to exchange information with a plurality of the mobile robots that is autonomously movable inside a facility by wireless communication and manage the mobile robots and transporting a transport object by using the mobile robots. The method includes causing the mobile robot to receive first transmission information transmitted from the server device to manage the mobile robot in a state where wireless communication with the server device is possible, and causing the mobile robot to directly execute wireless communication with another mobile robot among the mobile robots and execute a reception process of receiving the first transmission information transmitted from the server device to manage the mobile robot from the other mobile robot in a case where wireless communication with the server device is not possible. With such a process, the mobile robot can receive the information needed for management even in a case where wireless communication with the server device is not possible.

A fifth aspect of the present disclosure relates to a method for a mobile robot in a transport system including a server device configured to exchange information with a plurality of the mobile robots that is autonomously movable inside a facility by wireless communication and manage the mobile robots and transporting a transport object by using the mobile robots. The method includes causing the mobile robot to receive first transmission information transmitted from the server device to manage the mobile robot and second transmission information transmitted from the server device to manage another mobile robot among the mobile robots in a state where wireless communication with the server device is possible, and causing the mobile robot to directly execute wireless communication with the other mobile robot and execute a transmission process of transmitting the second transmission information to the other mobile robot in a case where wireless communication of the other mobile robot with the server device is not possible. With such a process, the other mobile robot can receive the information needed for management even in a case where wireless communication with the server device is not possible.

A sixth aspect of the present disclosure relates to a method for a server device in a transport system including the server device configured to exchange information with a plurality of mobile robots that is autonomously movable inside a facility by wireless communication and manage the mobile robots and transporting a transport object by using the mobile robots. The method includes causing the mobile robot to receive first transmission information transmitted from the server device to manage the mobile robot and second transmission information transmitted from the server device to manage another mobile robot among the mobile robots in a state where wireless communication with the server device is possible, causing the other mobile robot to receive the first transmission information and the second transmission information in a state where wireless communication with the server device is possible, causing the mobile robot to directly execute wireless communication with the other mobile robot, receive the first transmission information from the other mobile robot, and execute a first communication process of transmitting first positional information indicating a position of the mobile robot to the other mobile robot in a case where wireless communication with the server device is not possible, causing the other mobile robot to directly execute wireless communication with the mobile robot, receive the second transmission information from the mobile robot, and execute a second communication process of transmitting second positional information indicating a position of the other mobile robot to the mobile robot in a case where wireless communication with the server device is not possible, causing the server device to receive the first positional information received in the first communication process by the other mobile robot from the other mobile robot in a state where wireless communication with the other mobile robot is possible, causing the server device to receive the second positional information received in the second communication process by the mobile robot from the mobile robot in a state where wireless communication with the mobile robot is possible, causing the server device to search for the mobile robot based on the first positional information in a case where wireless communication with the mobile robot is not possible, and causing the server device to search for the other mobile robot based on the second positional information in a case where wireless communication with the other mobile robot is not possible. With such a process, in the method, it is possible to search for the mobile robot or the other mobile robot in which wireless communication with the server device is not possible.

A seventh aspect of the present disclosure relates to a computer-readable medium storing a program causing a computer mounted on a mobile robot to execute a communication process in a transport system including a server device configured to exchange information with a plurality of the mobile robots that is autonomously movable inside a facility by wireless communication and manage the mobile robots and transporting a transport object by using the mobile robots. The communication process includes receiving first transmission information transmitted from the server device to manage the mobile robot in a state where wireless communication with the server device is possible-, directly executing wireless communication with another mobile robot among the mobile robots and executing a reception process of receiving the first transmission information transmitted from the server device to manage the mobile robot from the other mobile robot in a case where wireless communication with the server device is not possible. With such a process, the mobile robot can receive the information needed for management even in a case where wireless communication with the server device is not possible.

An eighth aspect of the present disclosure relates to a computer-readable medium storing a program causing a computer mounted on a mobile robot to execute a communication process in a transport system including a server device configured to exchange information with a plurality of the mobile robots that is autonomously movable inside a facility by wireless communication and manage the mobile robots and transporting a transport object by using the mobile robots. The communication process includes receiving first transmission information transmitted from the server device to manage the mobile robot and second transmission information transmitted from the server device to manage another mobile robot among the mobile robots in a state where wireless communication with the server device is possible, and directly executing wireless communication with the other mobile robot and executing a transmission process of transmitting the second transmission information to the other mobile robot in a case where wireless communication of the other mobile robot with the server device is not possible. With such a process, the other mobile robot can receive the information needed for management even in a case where wireless communication with the server device is not possible.

A ninth aspect of the present disclosure relates to a computer-readable medium storing a program causing a server computer to execute a management process in a transport system including the server computer configured to exchange information with a plurality of mobile robots that is autonomously movable inside a facility by wireless communication and manage the mobile robots and transporting a transport object by using the mobile robots. The program causes the server computer to execute causing the mobile robot to receives first transmission information transmitted from the server computer to manage the mobile robot and second transmission information transmitted from the server computer to manage another mobile robot among the mobile robots in a state where wireless communication with the server computer is possible, causing the other mobile robot to receive the first transmission information and the second transmission information in a state where wireless communication with the server computer is possible, causing the mobile robot to directly execute wireless communication with the other mobile robot, receive the first transmission information from the other mobile robot, and execute a first communication process of transmitting first positional information indicating a position of the mobile robot to the other mobile robot in a case where wireless communication with the server computer is not possible, and causing the other mobile robot to directly execute wireless communication with the mobile robot, receive the second transmission information from the mobile robot, and execute a second communication process of transmitting second positional information indicating a position of the other mobile robot to the mobile robot in a case where wireless communication with the server computer is not possible. The management process includes receiving the first positional information received in the first communication process by the other mobile robot from the other mobile robot in a state where wireless communication with the other mobile robot is possible, receiving the second positional information received in the second communication process by the mobile robot from the mobile robot in a state where wireless communication with the mobile robot is possible, executing searching for the mobile robot based on the first positional information in a case where wireless communication with the mobile robot is not possible, and executing searching for the other mobile robot based on the second positional information in a case where wireless communication with the other mobile robot is not possible. With such a process, in the program, it is possible to search for the mobile robot or the other mobile robot in which wireless communication with the server device is not possible.

In the method according to the first, fourth, and seventh aspects of the present disclosure, the mobile robot may receive the first transmission information and second transmission information transmitted from the server device to manage the other mobile robot in a state where wireless communication with the server device is possible, and the mobile robot may directly execute wireless communication with the other mobile robot and may execute a transmission process of transmitting the second transmission information to the other mobile robot in a case where wireless communication of the other mobile robot with the server device is not possible. As a result, the other mobile robot can receive the information needed for management even in a case where wireless communication with the server device is not possible.

In the first, second, fourth, fifth, seventh, and eighth aspects of the present disclosure, the configurations as follows can be adopted.

The transmission process may be executed in a case where the server device shuts down, and the second transmission information transmitted in the transmission process may be information received from the server device before the server device shuts down. As a result, even in a case where wireless communication is not possible due to the server device going down, the other mobile robot can receive the information needed for management.

The reception process may be executed in a case where the server device shuts down, and the first transmission information received in the reception process may be information received by the other mobile robot from the server device before the server device shuts down. As a result, even in a case where wireless communication is not possible due to the server device going down, the mobile robot can receive the information needed for management.

The mobile robot may transmit state information indicating a state of the other mobile robot to the server device, the state information being transmitted from the other mobile robot, in a state where wireless communication with the server device is possible in a case where wireless communication of the other mobile robot with the server device is not possible. As a result, it is possible to manage the state of the other mobile robot in which wireless communication with the server device is not possible.

According to the present disclosure, it is possible to provide the mobile robot that, in a transport system that transports the transport object by using the mobile robots that can autonomously move inside the facility, can receive the information needed for management even in a case where wireless communication with the server device that manages the mobile robot is not possible, the transport system, the method, and the computer-readable medium.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart showing another example of the method according to the present embodiment.

DETAILED DESCRIPTION OF EMBODIMENTS

Hereinafter, the present disclosure will be described through embodiments of the disclosure, but the disclosure is not limited to the embodiments described below. In addition, all of the configurations described in the embodiments are not always needed as means for solving the problem.

Outline Configuration

Figure 1:
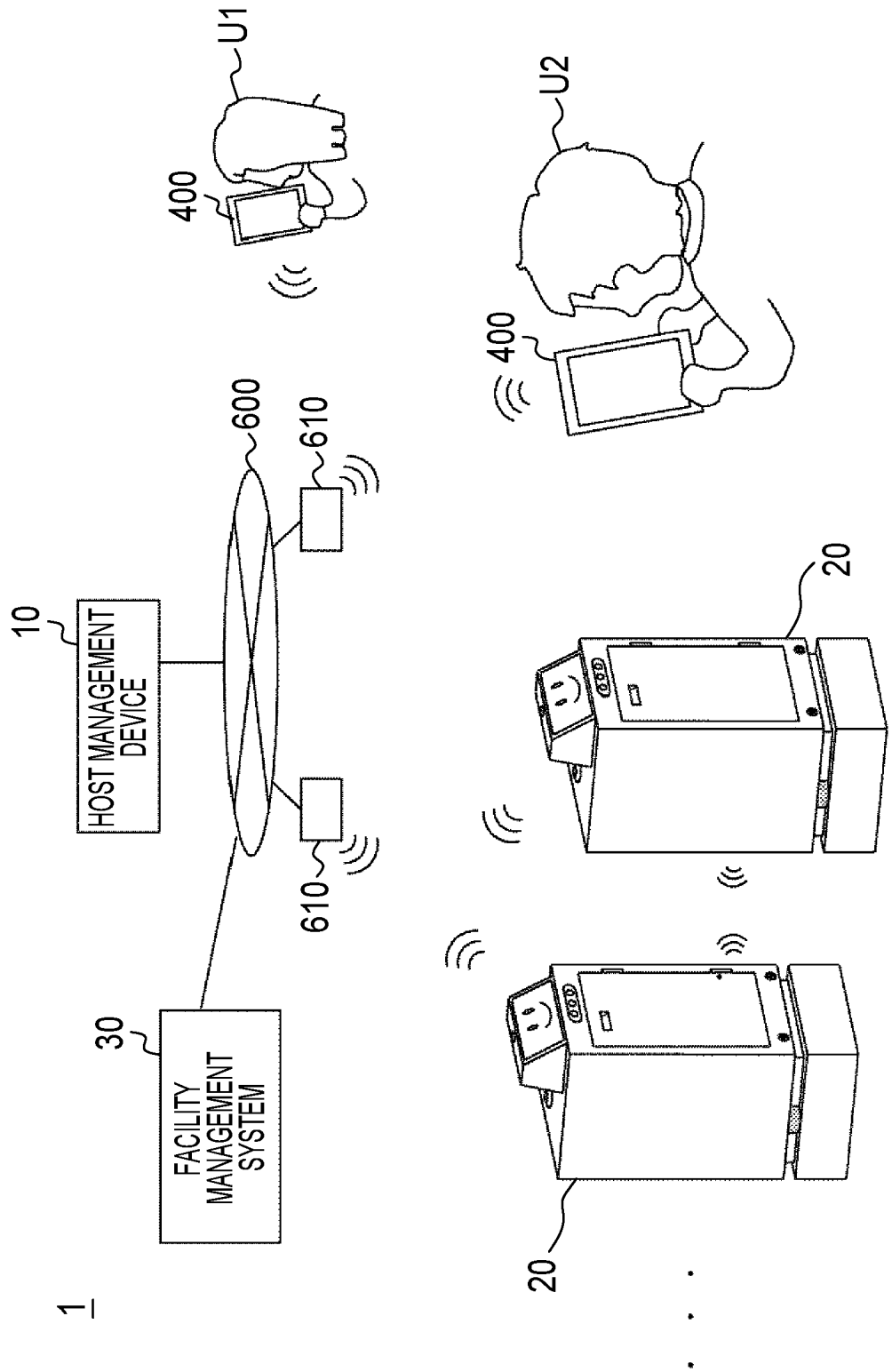
FIG. 1 is a conceptual diagram for describing an overall configuration example of a transport system in which a mobile robot according to the present embodiment is used.

FIG. 1 is a conceptual diagram for describing an overall configuration example of a transport system 1 in which a mobile robot 20 according to the present embodiment is used. The transport system 1 according to the present embodiment is a system that transports a transport object by using a plurality of mobile robots that can autonomously move inside the facility. As the mobile robot, for example, the mobile robot 20 as shown in FIG. 1 will be described here. Although the description is made based on the premise that each mobile robot 20 transports one or a plurality of the transport objects independently, a plurality of the mobile robots 20 may cooperate to transport one or more transport objects.

The transport system 1 can include, in addition to the mobile robot 20, a host management device 10, a facility management system 30, a network 600, a communication unit 610, and a user terminal 400.

The mobile robot 20 is a transport robot that executes the transport of the transport object as a task. The mobile robot 20 autonomously travels in order to transport the transport object in a medical welfare facility, such as a hospital, a rehabilitation center, a nursing facility, or an occupancy facility for the elderly. In addition, the transport system 1 according to the present embodiment can also be used inside a facility of a commercial facility (inside a building), such as a shopping mall. It is needless to say that the mobile robot 20 may be autonomously movable outside the facility in addition to inside the facility.

A user U1, such as a user or a user assistant of the transport object or manager of the transport object, makes a request for transporting the transport object to the mobile robot 20. The user U1 accommodates the transport object in the mobile robot 20 at a requested location at the time of the transport request or at a reception destination (transport source) included in information of the transport request. It is needless to say that the accommodation of the transport object can also be executed by an accommodation robot or the like. In some cases, the user U1 mounts the transport object on the mobile robot of another example (not shown) in a state of being exposed and transported, for the sake of simplification of the description, it is assumed that the transport object is transported in a state of being accommodated in the mobile robot 20.

Examples of the transport object include a device to be lent (hereinafter, referred to as lending device), and the lending device will be described as an example. Examples of the lending device include a medical device, such as inspection equipment or medical equipment. Note that the mobile robot 20 can also transport a device other than the lending device or a transport object other than the device, for example, supplies, such as a medicine, a consumable, such as a packaging bag, a specimen, a hospital food, or stationery.

The user U1 can make a request for transporting the lending device in response to a schedule of lending (lending schedule). The lending schedule can be managed by a device lending system (not shown) connected to the network 600, can be referred to by the user U1 from the user terminal 400 for the transport request, and can also be referred to from the host management device 10.

The mobile robot 20 autonomously moves to a set destination and transports the lending device. That is, the mobile robot 20 executes a package transport task (hereinafter, also simply referred to as a task). In the following description, a location where the lending device is mounted is the transport source, and a location where the lending device is transported is a transport destination.

For example, the mobile robot 20 is assumed to move inside a general hospital having a plurality of clinical departments. The mobile robot 20 transports the lending device between the clinical departments. For example, the mobile robot 20 transports the lending device from a nurse station of one clinical department to a nurse station of another clinical department. Alternatively, the mobile robot 20 transports the lending device from a storage thereof to the nurse station of the clinical department. In addition, in a case where the transport destinations are on different floors, the mobile robot 20 may move by using an elevator or the like.

In the transport system 1 shown in FIG. 1, the facility management system 30, the mobile robot 20, and the user terminal 400 are connected to the host management device 10 via the network 600. The mobile robot 20 and the user terminal 400 are connected to the network 600 via the communication unit 610. The network 600 is a wired or wireless local area network (LAN) or wide area network (WAN). Further, the host management device 10 is connected to the network 600 by wire or wirelessly. The communication unit 610 is a wireless LAN unit installed in each environment, for example. The communication unit 610 may be a general-purpose communication device, such as a Wi-Fi router.

The host management device 10 is a server (server device) connected to each device, and collects data from each device. In addition, the host management device 10 is not limited to a physically single device, and may have a plurality of devices that executes distributed processes. In addition, the host management device 10 may be disposed by being distributed to an edge device, such as the mobile robot 20. For example, a part or all of the transport system 1 may be mounted on the mobile robot 20.

The user terminal 400 is, for example, a tablet computer or a smartphone, but may be a stationary computer. The user terminal 400 need only be an information processing device that can execute communication by wire or wirelessly.

The user U1 or a user U2 can make the transport request by using the user terminal 400. For example, the user U1 can refer to the schedule by accessing to the device lending system for the transport request from the user terminal 400 (may be via the host management device 10) and execute the transport request for the lending device to the host management device 10 based on a reference result. In the transport request, transport request information including, for example, a content of the lending device, the transport source, the transport destination, a scheduled time of arrival at the transport source (reception time of the lending device), and a scheduled time of arrival at the transport destination (transport deadline) can be transmitted to the host management device 10. The lending device can be mounted on the mobile robot 20 at timing before and after the transport request from the user terminal 400 is transmitted, for example.

The host management device 10 that receives the transport request can make the transport request to the mobile robot 20. The host management device 10 is a management system that manages the mobile robots 20, and transmits an operation instruction for executing the transport task to each mobile robot 20. In this case, the host management device 10 decides the mobile robot 20 that executes the transport task for each transport request. Then, the host management device 10 transmits a control signal including the operation instruction to the mobile robot 20. The mobile robot 20 moves to arrive from the transport source to the transport destination in response to the operation instruction.

For example, the host management device 10 assigns the transport task to the mobile robot 20 at the transport source or in the vicinity of the transport source. Alternatively, the host management device 10 assigns the transport task to the mobile robot 20 moving toward the transport source or the vicinity of the transport source. The mobile robot 20 to which the task is assigned moves to the transport source to take the lending device. Examples of the transport source include a storage location or a location where the user U1 who makes the request for the task is located.

When the mobile robot 20 arrives at the transport source, the user U1 or another staff member mounts the lending device on the mobile robot 20. The mobile robot 20 on which the lending device is mounted autonomously moves to the transport destination as the destination. The host management device 10 transmits signals to the user terminal 400 of the user U2 at the transport destination. As a result, the user U2 can know that the lending device is being transported or the scheduled time of arrival. When the mobile robot 20 arrives at the set transport destination, the user U2 can receive the lending device accommodated in the mobile robot 20. As described above, the mobile robot 20 executes the transport task.

As described above, various signals transmitted from the user terminals 400 of the users U1, U2 can be once transmitted to the host management device 10 via the network 600, and can be transferred from the host management device 10 to the target mobile robot 20. Similarly, various signals transmitted from the mobile robot 20 are once transmitted to the host management device 10 via the network 600, and are transferred from the host management device 10 to the target user terminal 400.

The user terminal 400 and the mobile robot 20 may transmit and receive the signals without using the host management device 10. For example, the user terminal 400 and the mobile robot 20 may directly transmit and receive the signals by wireless communication. Alternatively, the user terminal 400 and the mobile robot 20 may transmit and receive the signals via the communication unit 610.

The facility management system 30 is a system that manages the facility, and can manage, for example, a fire alarm, an earthquake detector (sway detector), a lighting device, and an air conditioning device in each area inside the facility. In addition to the management of the device of a management target, the facility management system 30 collects disaster information via the Internet or the like, and transmits the information to the host management device 10 solely at all times or in a case where an emergency degree is high.

The facility management system 30 may be disposed such that a part of the functions thereof is distributed to the host management device 10, or can be disposed such that a part of the functions thereof is incorporated in the host management device 10. The facility management system 30 may be disposed such that a part of the functions is distributed to the edge device, such as the mobile robot 20.

In addition, the host management device 10 may go down (shut down) in a case where a notification from the facility management system 30 indicates a high emergency degree or due to a failure. In such a case, the host management device 10 will be reactivated, and after reactivation, the host management device 10 can collect state information, such as a position or a remaining battery level from each mobile robot 20, reset the task as needed based on the collected state information, and transmit the signals, such as the operation instruction after resetting to each mobile robot 20.

Control Block Diagram

Figure 2:
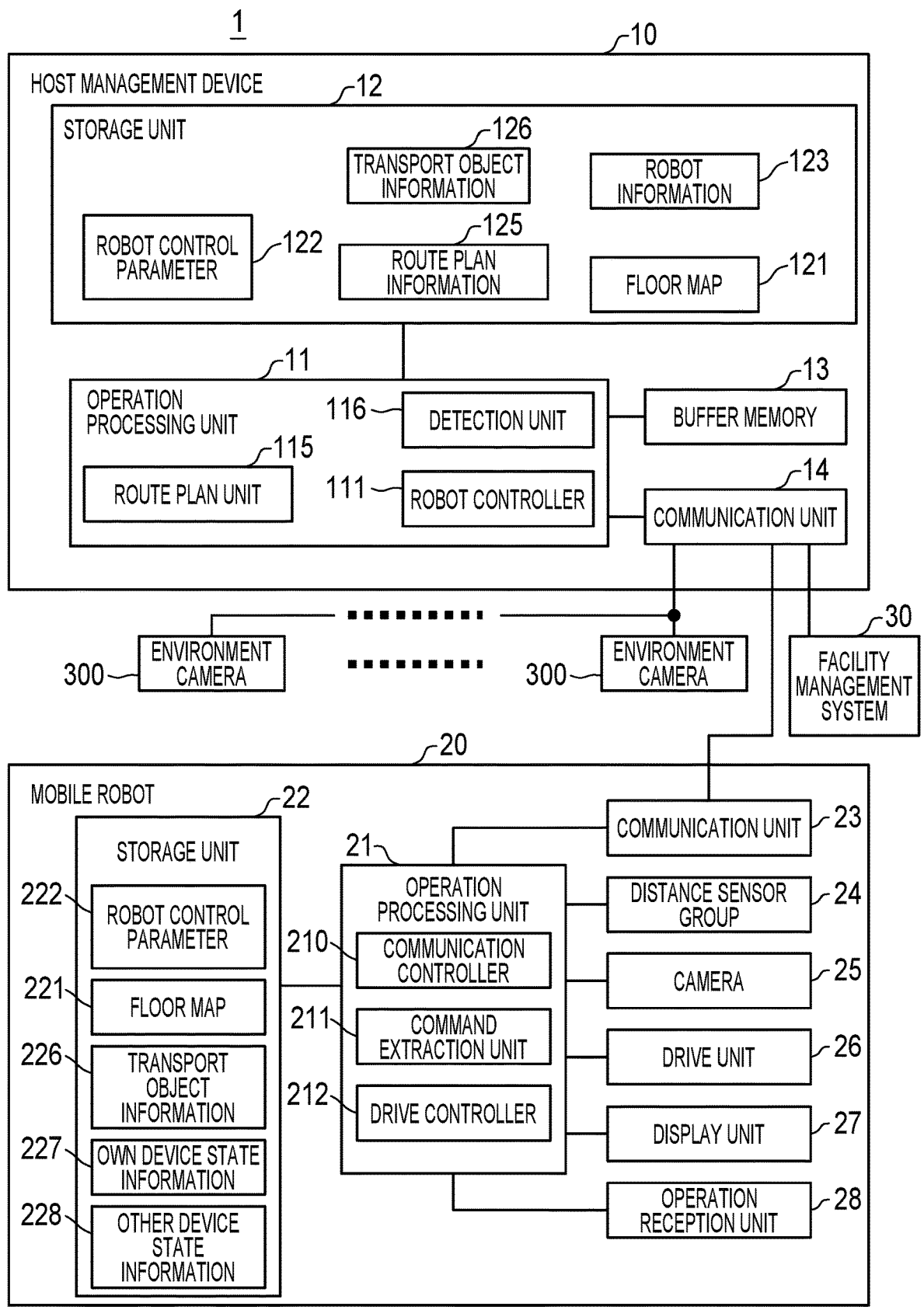
FIG. 2 is a control block diagram showing an example of the transport system according to the present embodiment.
Figure 3:
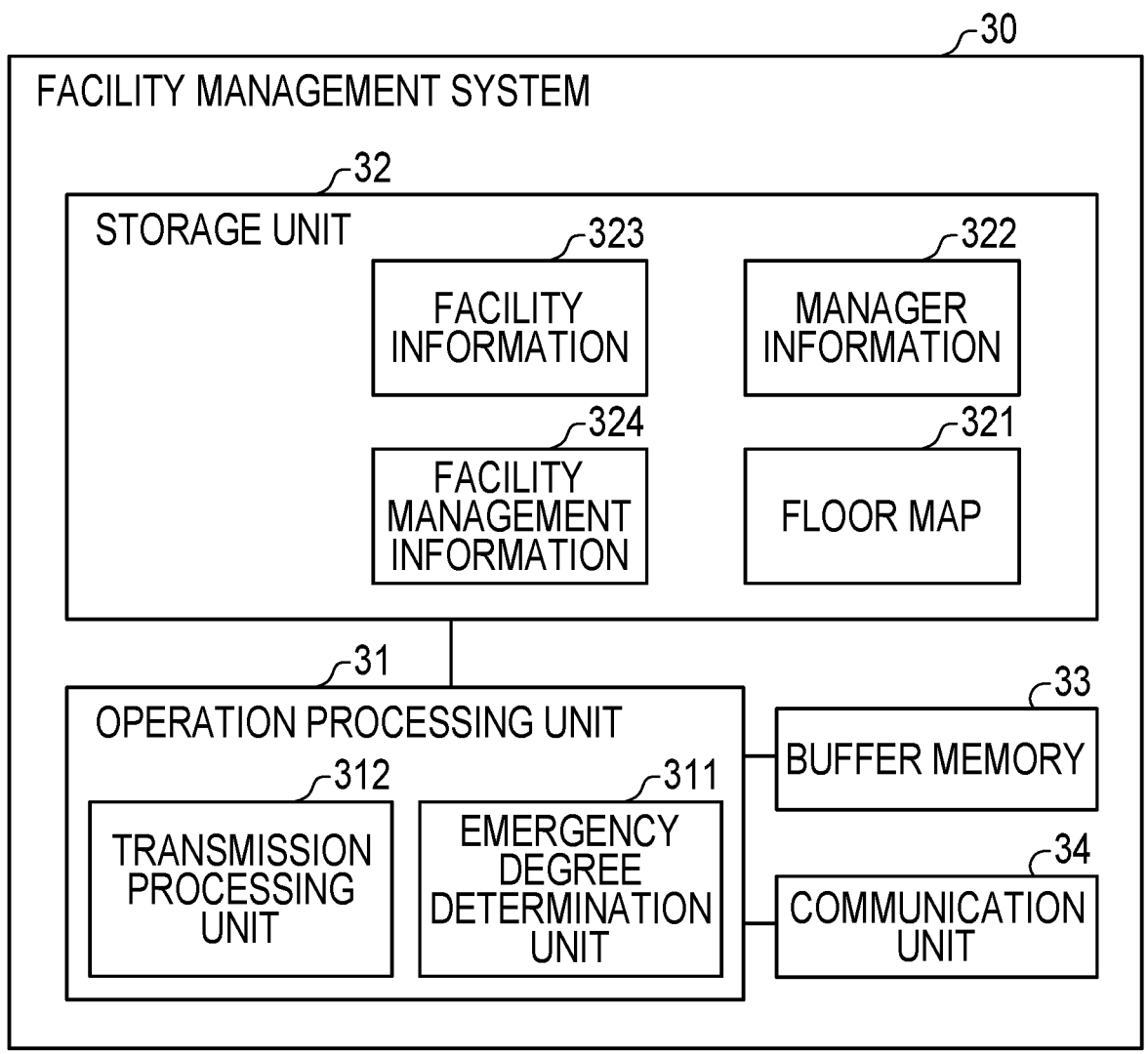
FIG. 3 is a control block diagram showing an example of a facility management system.

FIG. 2 is a control block diagram showing an example of a control system of the transport system 1, and FIG. 3 is a control block diagram showing an example of the facility management system 30 in the transport system 1 of FIGS. 1 and 2. As shown in FIG. 2, the transport system 1 can include the host management device 10, the mobile robot 20, the facility management system 30, and an environment camera 300.

The transport system 1 efficiently controls the mobile robots 20 while causing the mobile robots 20 to autonomously move inside a predetermined facility. Therefore, a plurality of the environment cameras 300 is installed inside the facility. For example, the environment cameras 300 are installed in a passage, a hall, an elevator, and exit and entrance inside the facility.

The environment camera 300 acquires an image of a range in which the mobile robot 20 moves. In the transport system 1, the host management device 10 collects the image acquired by the environment camera 300 or information based on the image. Alternatively, the image or the like acquired by the environment camera 300 may be directly transmitted to the mobile robot. The environment camera 300 may be a surveillance camera or the like provided in the passage or the exit and entrance inside the facility. The environment camera 300 may be used to obtain a distribution of statuses of congestion inside the facility.

Here, an example is described in which the environment camera 300 is directly connected to the host management device 10. However, a configuration can be adopted in which the environment camera 300 is the management target of the facility management system 30, and the data obtained by the environment camera 300 via the facility management system 30 is received by the host management device 10.

In the transport system 1, the host management device 10 executes a route plan based on the transport request information and generates route plan information. The route plan information can be generated as information for planning a transport route corresponding to a transport schedule described above. The host management device 10 gives an instruction of the destination to each mobile robot 20 based on generated route plan information. Further, the mobile robot 20 autonomously moves toward the destination designated by the host management device 10. The mobile robot 20 autonomously moves toward the destination by using a sensor provided in its own device, a floor map, positional information, and the like.

For example, the mobile robot 20 travels so as not to come into contact with surrounding devices, objects, walls, and people (hereinafter, collectively referred to as surrounding object). Specifically, the mobile robot 20 detects a distance to the surrounding object and travels in a state of being separated from the surrounding object by equal to or more than a certain distance (referred to as a distance threshold value). When the distance to the surrounding object is equal to or less than the distance threshold value, the mobile robot 20 decelerates or stops. In this manner, the mobile robot 20 can travel without coming into contact with the surrounding object. Since the contact can be avoided, safe and efficient transport is possible.

In addition, the host management device 10 can transmit a restriction instruction (restriction command) for executing restriction of the operation, such as an emergency stop, to each mobile robot 20, and the mobile robot 20 that receives the restriction instruction can restrict the operation of its own device based on the restriction instruction.

The host management device 10 can have an operation processing unit 11, a storage unit 12, a buffer memory 13, and a communication unit 14. The operation processing unit 11 executes an operation for controlling and managing the mobile robot 20. The operation processing unit 11 can be implemented as a device that can execute a program of a central processing unit (CPU) of a computer, for example. Further, various functions can be realized by the program. In FIG. 2, solely a robot controller 111, a route plan unit 115, and a detection unit 116 that are features of the operation processing unit 11 are shown, but other processing blocks can also be provided.

The robot controller 111 executes an operation for remotely controlling the mobile robot 20 and generates the control signal. The robot controller 111 generates the control signal based on route plan information 125 to be described below and the like. Further, the control signal is generated based on various pieces of information obtained from the environment camera 300 or the mobile robot 20. The control signal may include update information, such as a floor map 121, robot information 123, and a robot control parameter 122 to be described below. That is, in a case where the various pieces of information are updated, the robot controller 111 generates the control signal in response to the updated information.

The update of information can be executed even in a case where communication with the certain mobile robot 20 is not possible. As one of the main features of the transport system 1 according to the present embodiment, in a case where the host management device 10 cannot execute communication with a certain mobile robot 20, inter-robot communication is executed.

Through the inter-robot communication, the mobile robot 20 can obtain needed information. Further, the state information of another mobile robot 20 that cannot execute communication with the host management device 10 can be obtained by the mobile robot 20 that can execute communication with the host management device 10 by the inter-robot communication and can transmit the obtained state information to the host management device 10. The state information can also include own error information of the mobile robot 20, traffic closure information acquired by own sensor of the mobile robot 20, and the like. Then, the robot controller 111 can update the robot information 123, the robot control parameter 122, and transport object information 126, and the like based on the state information of the other mobile robot 20 (other device state information 228) transmitted from the mobile robot 20 about the other mobile robot 20 that cannot execute communication, and can generate the control signal based on the updated information.

The route plan unit 115 makes the route plan of each mobile robot 20. When the transport task is input, the route plan unit 115 makes the route plan for transporting the lending device to the transport destination (destination) based on the transport request information. Specifically, the route plan unit 115 decides the mobile robot 20 to execute a new transport task with reference to the route plan information 125, the robot information 123, or the like already stored in the storage unit 12. A departure location is a current position of the mobile robot 20, the transport destination of the immediately preceding transport task, the reception destination of the lending device, or the like. The destination is the transport destination of the lending device, but may be a standby location, a charging location, or the like.

Here, the route plan unit 115 sets passage points from the departure location to the destination of the mobile robot 20. The route plan unit 115 sets passage order of the passage points for each mobile robot 20. The passage points are set, for example, at a branch point, an intersection point, lobby in front of an elevator, or surroundings thereof. In addition, in a narrow passage, it may be difficult for the mobile robot 20 to pass each other. In such a case, the passage point may be set in front of the narrow passage. A candidate for passage point may be registered in the floor map 121 in advance.

The route plan unit 115 decides the mobile robot 20 to execute each transport task among the mobile robots 20 such that the task can be efficiently executed as the entire system. The route plan unit 115 preferentially assigns the transport task to the standby mobile robot 20 or the mobile robot 20 close to the transport source.

The route plan unit 115 sets the passage point including the departure location and the destination for the mobile robot 20 to which the transport task is assigned. For example, in a case where there are two or more movement routes from the transport source to the transport destination, the passage point is set such that the movement can be executed in a short time. Therefore, the host management device 10 updates information indicating the status of congestion of the passage based on the image of the camera or the like. Specifically, the location where the other mobile robot 20 passes and the location where there are many people are highly congested. Therefore, the route plan unit 115 sets the passage point to avoid the highly congested location.

The mobile robot 20 may be able to move to the destination by either a counterclockwise movement route or a clockwise movement route. In such a case, the route plan unit 115 sets the passage point to pass through the movement route that is not congested. By the route plan unit 115 setting one or a plurality of the passage points to the destination, the mobile robot 20 can move on the movement route that is not congested. For example, in a case where the passage is divided at the branch point or the intersection point, the route plan unit 115 appropriately sets the passage point at the branch point, the intersection point, a corner, and the surroundings thereof. As a result, the transport efficiency can be improved.

The route plan unit 115 may set the passage point in consideration of the status of congestion of the elevator, the movement distance, or the like. Further, the host management device 10 may estimate the number of the mobile robots 20 or the number of people at scheduled time when the mobile robot 20 passes through a certain location. Then, the route plan unit 115 may set the passage point in response to the estimated status of congestion. In addition, the route plan unit 115 may dynamically change the passage point in response to the change in the status of congestion. The route plan unit 115 sequentially sets the passage points for the mobile robot 20 to which the transport task is assigned. The passage point may include the transport source or the transport destination. As will be described below, the mobile robot 20 autonomously moves to sequentially pass through the passage points set by the route plan unit 115.

The detection unit 116 detects emergency information transmitted from the facility management system 30 and received by the communication unit 14. The emergency information is for giving a notification of the occurrence of an emergency event, such as the fire or the earthquake. When such a notification is detected by the detection unit 116, the robot controller 111 transmits the control signal including the restriction instruction (restriction command) for executing restriction of the operation, such as the emergency stop, to the mobile robot 20 via the communication unit 14. In addition, the robot controller 111 may store a transmission history of the restriction instruction at a stage where the detection unit 116 detects, prior to the transmission, the control signal including the restriction instruction or immediately after the transmission. The robot controller 111 can also be configured to transmit a restriction release instruction to the mobile robot 20, and in such a case, the release instruction can be given with reference to the transmission history. The release instruction can be an instruction for reactivating the mobile robot 20. The instruction can be included in the control signal and transmitted to the mobile robot 20.

In addition, the operation processing unit 11 can execute shutdown of the host management device 10 to protect the host management device 10 particularly in a case where a notification having high emergency degree (notification of a fire or an earthquake equal to or more than a certain level) is detected among cases where the notification is detected by the detection unit 116 as described above. In addition, when the robot controller 111 of the operation processing unit 11 is reactivated after shutdown, the host management device 10 can collect the state information, such as the position or the remaining battery level from each mobile robot 20, reset the task as needed based on the collected state information, and transmit the signals, such as the operation instruction after resetting to each mobile robot 20.

The storage unit 12 is a storage unit that stores the information needed for managing and controlling the robot. In the example of FIG. 2, the floor map 121, the robot information 123, the robot control parameter 122, the route plan information 125, and the transport object information 126 are shown, but the information stored in the storage unit 12 may be information other than the above information, for example, the transmission history. The operation processing unit 11 executes an operation using the information stored in the storage unit 12 when executing various processes. In addition, the various pieces of information stored in the storage unit 12 can be updated to the latest information.

The floor map 121 is map information of the facility in which the mobile robot 20 moves. The floor map 121 may be created in advance, may be generated from the information obtained from the mobile robot 20, or may be obtained by adding map correction information generated from the information obtained by the mobile robot 20 to a basic map created in advance.

The robot information 123 describes an ID, a model number, a specification, and the like of the mobile robot 20 managed by the host management device 10. The robot information 123 may include information on the lending device that can be transported and the lending device that cannot be transported.

In addition, the robot information 123 can include the state information, such as the positional information indicating the current position of the mobile robot 20 or remaining level information indicating the current remaining battery level. The state information is information corresponding to own device state information 227 to be described below, and may be complemented by the other device state information 228 in a case where communication with the host management device 10 is not possible. In addition, the state information described above can include information indicating whether or not the mobile robot 20 is in a normal operation (operating), is being restricted, or is failing, and at the time of restriction, can include information indicating that the mobile robot 20 is being restricted as the transmission history described above. In addition, the state information may include information indicating whether or not the mobile robot 20 is executing the task or is being standby.

In the robot control parameter 122, a control parameter, such as a threshold distance to the surrounding object, for the mobile robot 20 managed by the host management device 10 is described. The threshold distance is a margin distance for avoiding the contact with the surrounding object including a person. Further, the robot control parameter 122 may include information on operation intensity, such as a speed upper limit value of a movement speed of the mobile robot 20.

The robot control parameter 122 may be updated depending on the status. The robot control parameter 122 may include information indicating availability or a usage status of an accommodation space of a storage 291 to be described below. The robot control parameter 122 may include the information on the lending device that can be transported or the lending device that cannot be transported. It is needless to say that the robot control parameter 122 can also include information indicating possibility of the transport of the transport object other than the lending device. The robot control parameter 122 is associated with the various pieces of information described above for each mobile robot 20.

The route plan information 125 includes the route plan information planned by the route plan unit 115. The route plan information 125 includes, for example, information indicating the transport task. The route plan information 125 may include information on the ID of the mobile robot 20 to which the task is assigned, the departure location, the content of the lending device, the transport destination, the transport source, the scheduled time of arrival at the transport destination, the scheduled time of arrival at the transport source, an arrival deadline, and the like. In the route plan information 125, the various pieces of information described above may be associated with each transport task. The route plan information 125 may include at least a part of the transport request information input from the user U1.

Further, the route plan information 125 may include information on the passage point for each mobile robot 20 or the transport task. For example, the route plan information 125 includes information indicating the passage order of the passage points for each mobile robot 20. The route plan information 125 may include a coordinate of each passage point on the floor map 121 or information on whether or not the passage point is passed.

The transport object information 126 is information on the lending device for which the transport request is made. For example, the transport object information 126 includes the information, such as the content (type) of the lending device, the transport source, and the transport destination. It is needless to say that the transport object information 126 may include information on the transport object other than the lending device, and hereinafter, the same applies to information other than the transport object information 126. The transport object information 126 may include the ID of the mobile robot 20 in charge of the transport. Further, the transport object information 126 may include information indicating the status, such as during the transport, before the transport (before mounting), and transport completion. The transport object information 126 is associated with these pieces of information for each lending device.

The route plan unit 115 makes the route plan with reference to the various pieces of information stored in the storage unit 12. For example, the mobile robot 20 that executes the task is decided based on the floor map 121, the robot information 123, the robot control parameter 122, and the route plan information 125. Then, the route plan unit 115 sets the passage points to the transport destination and the passage order of the passage points with reference to the floor map 121 and the like. The candidate for the passage point is registered in advance on the floor map 121. Then, the route plan unit 115 sets the passage point in response to the status of congestion and the like. In addition, in a case of continuously processing the task, the route plan unit 115 may set the transport source and the transport destination as the passage points.

The buffer memory 13 is a memory that stores intermediate information generated in the process of the operation processing unit 11. The communication unit 14 is a communication interface that executes communication between the facility management system 30, a plurality of the environment cameras 300 provided in the facility where the transport system 1 is operated, and the mobile robots 20. The communication unit 14 can execute both wired communication and wireless communication. However, communication with the mobile robot 20 is wireless communication. For example, the communication unit 14 transmits the control signal needed for controlling the mobile robot 20 to each mobile robot 20. In addition, the communication unit 14 receives the information collected by the mobile robot 20 or the environment camera 300. The communication unit 14 may be able to receive the various pieces of information, such as the emergency information from the facility management system 30, and may be able to transmit a request for such pieces of information to the facility management system 30.

The mobile robot 20 can have an operation processing unit 21, a storage unit 22, a communication unit 23, a proximity sensor (for example, a distance sensor group 24), a camera 25, a drive unit 26, a display unit 27, and an operation reception unit 28. Although FIG. 2 shows solely representative processing blocks provided in the mobile robot 20, the mobile robot 20 also includes many other processing blocks (not shown).

The communication unit 23 has a first communication interface that executes communication (wireless communication) with the communication unit 14 of the host management device 10 and a second communication interface that executes wireless communication with the communication unit 23 of the other mobile robot 20. The communication unit 23 executes communication with the communication unit 14 by using a wireless signal. The communication unit 23 receives first transmission information transmitted from the host management device 10 in order to manage the mobile robot 20 in a state where wireless communication with the host management device 10 is possible. As described above, the first transmission information is information, such as the command or other information, and can be received as the control signal.

In the second communication interface, the inter-robot communication need only be executed as described above, for example, short-range wireless communication, such as Bluetooth (registered trademark; the same applies in the following) communication, can be used. In the present embodiment, the information transmitted and received by the inter-robot communication can be the positional information on the own device of the mobile robot 20 and the other device, the state information, such as the remaining battery level, or the information (command or the like) transmitted from the host management device 10 to the other device.

The distance sensor group 24 is, for example, the proximity sensor, and outputs proximity object distance information indicating the distance to the object or the person present around the mobile robot 20. The camera 25 captures, for example, an image for grasping the surrounding status of the mobile robot 20. In addition, the camera 25 can also capture an image of a position marker provided on a ceiling of the facility or the like, for example. The mobile robot 20 may grasp the position of its own device by using the position marker.

The drive unit 26 drives drive wheels provided in the mobile robot 20. The drive unit 26 may have an encoder that detects the number of rotations of the drive wheels or drive motors of the drive wheels. The position (current position) of the own device of the mobile robot 20 may be estimated in response to an output of the encoder. The mobile robot 20 detects own current position and transmits the detected current position to the host management device 10.

The display unit 27 and the operation reception unit 28 are realized by a touch panel display. The display unit 27 displays a user interface screen that serves as the operation reception unit 28. In addition, the display unit 27 may display the information indicating the destination of the mobile robot 20 or the state of the mobile robot 20. The operation reception unit 28 receives the operation from the user. The operation reception unit 28 includes various switches provided in the mobile robot 20 in addition to the user interface screen displayed on the display unit 27.

The operation processing unit 21 executes the operation used for controlling the mobile robot 20. The operation processing unit 21 can be implemented as the device that can execute the program of the central processing unit (CPU) of the computer, for example. Further, various functions can be realized by the program. The operation processing unit 21 can include a communication controller 210, a command extraction unit 211, and a drive controller 212. Although FIG. 2 shows solely representative processing blocks provided in the operation processing unit 21, processing blocks (not shown) are also provided. The operation processing unit 21 may search for the route between the passage points.

The communication controller 210 determines whether or not the communication between the communication unit 23 and the communication unit 14 is possible. The determination itself can be executed by trying communication and executing a threshold process on a received radio wave, and it is possible to determine whether or not the mobile robot 20 is isolated from the host management device 10 by the determination. In addition, as a result of the determination, in a case where communication with the communication unit 14 is not possible, that is, in a state where communication with the host management device 10 is not possible, the communication controller 210 tries the inter-robot communication with the other mobile robot 20. Then, when communication with the communication unit 23 of the other mobile robot 20 in the communication unit 23 is possible, the communication controller 210 receives the first transmission information from the other mobile robot 20 by the inter-robot communication or receives the first transmission information and transmits the own device state information 227 to the other mobile robot 20.

The first transmission information is the information (command or the like) transmitted from the host management device 10 in order to manage (control) the mobile robot 20 as described above, and can be transmitted as the control signal to the mobile robot 20. Note that in this case, since a status is described where communication with the host management device 10 is not possible, the first transmission information is received by the other mobile robot 20 and transmitted from the other mobile robot 20.

In addition, in the mode in which the mobile robot 20 transmits the own device state information 227, the own device state information 227 is received by the other mobile robot 20 and transmitted to the host management device 10 as the other device state information 228. As a result, the host management device 10 can obtain the own device state information 227 of the mobile robot 20 in the state where the communication is not possible.

The command extraction unit 211 extracts the restriction command, such as a movement command or an emergency stop command, from the control signal given by the host management device 10. For example, the movement command includes information on the next passage point. For example, the control signal for the movement command may include information on the coordinate of the passage point or the passage order of the passage points. Then, the command extraction unit 211 extracts the information as the movement command.

In addition, the movement command may include information indicating that the movement to the next passage point is possible. When a passage width is narrow, the mobile robots 20 may not be able to pass each other. In addition, the mobile robot 20 may not be able to pass through the passage transitorily. In such a case, the control signal includes a command for causing the mobile robot 20 to stop at the passage point in front of the stop location. Then, after the other mobile robot 20 passes or can pass, the host management device 10 outputs the control signal for giving a notification that the mobile robot 20 can move. As a result, the mobile robot 20 that transitorily stops resumes the movement.

The drive controller 212 controls the drive unit 26 to cause the mobile robot 20 to move and restrict the operation based on the movement command and the restriction command given from the command extraction unit 211, respectively. For example, the drive unit 26 has drive wheels that are rotated in response to a control instruction value from the drive controller 212. The command extraction unit 211 extracts the movement command such that the mobile robot 20 moves toward the passage point received from the host management device 10. Further, the drive unit 26 rotationally drives the drive wheels. The mobile robot 20 autonomously moves toward the next passage point. In this manner, the mobile robot 20 sequentially passes the passage points and arrives at the transport destination. In addition, the mobile robot 20 may estimate a position of its own device and transmit the signal indicating that the mobile robot 20 passes the passage point to the host management device 10. As a result, the host management device 10 can manage the current position or a transport status of each mobile robot 20.

In addition, the command extraction unit 211 extracts the restriction command from the host management device 10, and the drive unit 26 executes a control, such as causing the drive wheels to stop. In addition, the restriction command may include a command for directing the mobile robot 20 to a specific area, and in such a case, the drive unit 26 rotationally drives the drive wheels to direct the mobile robot 20 to the area.

The storage unit 22 can store a floor map 221, a robot control parameter 222, transport object information 226, the own device state information 227, and the other device state information 228. Although solely a part of the information stored in the storage unit 22 is shown in FIG. 2, information other than the information shown in FIG. 2 can be included.

The floor map 221 is the map information of the facility in which the mobile robot 20 moves. The floor map 221 is data obtained by downloading a part or all of the floor map 121 of the host management device 10, for example. The floor map 221 may be created in advance. In addition, the floor map 221 may be map information including a part of a moving scheduled region, instead of the map information of the entire facility. The robot control parameter 222 is a parameter for operating the mobile robot 20. The robot control parameter 222 includes, for example, the distance threshold value with the surrounding object. Further, the robot control parameter 222 includes the speed upper limit value of the mobile robot 20.

The transport object information 226 includes the information on the lending device in the same manner as the transport object information 126. The transport object information 226 can include the information, such as the content (type, that is, model) of the lending device, the transport source, and the transport destination. The transport object information 226 may include the information indicating the status, such as during the transport, before the transport (before mounting), and transport completion. The transport object information 226 is associated with these pieces of information for each lending device. The transport object information 226 need only include information on the lending device transported by the mobile robot 20. Therefore, the transport object information 226 is a part of the transport object information 126. That is, the transport object information 226 does not have to include the information transported by the other mobile robot 20.

The own device state information 227 is the state information described above indicating the state of the current position of the own device of the mobile robot, the remaining battery level, or the like, and can be stored at least in a case where communication with the host management device 10 is not possible. It is needless to say that the own device state information 227 can be updated at all times regardless of a communication state with the host management device 10.

The other device state information 228 is information transmitted from the other mobile robot 20 in a case where the other mobile robot 20 cannot execute communication with the host management device 10, and information items can be the minimum items similar to or less than the items of the own device state information 227. In addition, the other device state information 228 can also include the transport object information 226 managed by the other mobile robot 20.

The drive controller 212 causes the operation to stop or decelerate in response to the distance indicated by the distance information obtained from the distance sensor group 24 falling below the distance threshold value with reference to the robot control parameter 222. The drive controller 212 controls the drive unit 26 such that the mobile robot 20 travels at a speed equal to or less than an upper speed upper limit value. The drive controller 212 restricts a rotation speed of the drive wheels such that the mobile robot 20 does not move at a speed equal to or more than the upper speed upper limit value.

As shown in FIG. 3, the facility management system 30 can have an operation processing unit 31, a storage unit 32, a buffer memory 33, and a communication unit 34. The operation processing unit 31 executes an operation for managing equipment inside the facility. The operation processing unit 31 can be implemented as the device that can execute the program of the central processing unit (CPU) of the computer, for example. Further, various functions can be realized by the program. In FIG. 3, solely an emergency degree determination unit 311 and a transmission processing unit 312 that are features of the operation processing unit 31 are shown, but other processing blocks can also be provided.

The emergency degree determination unit 311 determines the emergency degree of the facility with reference to the disaster information received from the communication unit 34 via the Internet or facility management information 324 for managing various pieces of equipment (for example, the fire alarm and the earthquake detector) inside the facility. Here, the emergency degree can be information indicating the degree of whether or not the host management device 10 is needed to shut down.

In a case where the emergency degree determination unit 311 determines that the emergency degree is higher than a predetermined threshold value, the transmission processing unit 312 executes a process of transmitting emergency information indicating the emergency degree is higher than the predetermined threshold value to the host management device 10. The emergency information is for giving the notification of the occurrence of the emergency event to be handled, such as the fire or the earthquake, and can be transmitted to the host management device 10 by the transmission processing unit 312 controlling the communication unit 34. That is, the transmission processing unit 312 transmits the emergency information to the host management device 10 via the communication unit 34. In a case where the emergency degree is higher than the predetermined threshold value, the transmission processing unit 312 can also transmit the emergency information including a value of the emergency degree to the host management device 10.

The storage unit 32 is a storage unit that stores information needed for controlling the facility management system 30. In the example of FIG. 3, a floor map 321, manager information 322, facility information 323, and the facility management information 324 are shown, but the information stored in the storage unit 32 may be other than the above information. The operation processing unit 31 executes the operation using the information stored in the storage unit 32 when executing various processes. In addition, the various pieces of information stored in the storage unit 32 can be updated to the latest information.

The floor map 321 can be a part or all of the floor map 121. The facility information 323 is information indicating the ID, the type, or the like of the equipment inside the facility, can include information indicating an installation location of the equipment, and the installation location information can be linked to the floor map 321. The facility management information 324 includes information indicating an operation status of each equipment or a value of a mounted sensor indicated by the facility information 323, and can be updated at any time. For example, in a case where the fire alarm is provided as the equipment, when the fire is detected, information indicating the occurrence of the fire is written. The manager information 322 is information associated with each equipment indicated by the facility information 323, and can include information indicating a manager of each equipment and information indicating a notification destination to each manager.

The buffer memory 33 is a memory that stores intermediate information generated in the process of the operation processing unit 31. The communication unit 34 is a communication interface that executes communication with the host management device 10, and the communication interface can also be configured to execute communication with the user terminal 400 or the mobile robot 20. The communication unit 34 can execute both the wired communication and wireless communication. For example, the communication unit 34 can transmit the information, such as the emergency information, to the host management device 10 or receive the various pieces of information from the host management device 10 or the user terminal 400.

Configuration of Mobile Robot 20

Figure 4:
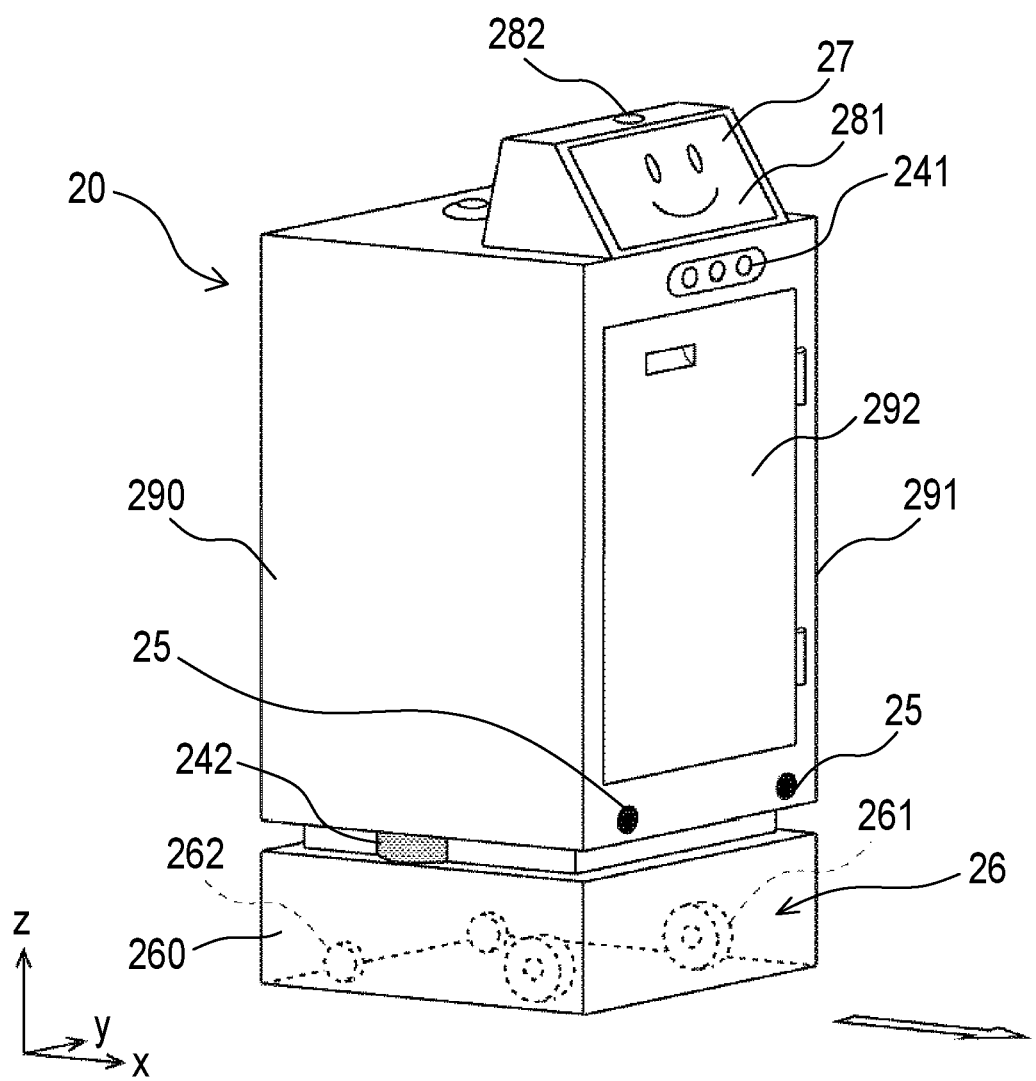
FIG. 4 is a schematic diagram showing an example of the mobile robot.

Here, an appearance of the mobile robot 20 will be described. FIG. 4 shows a schematic diagram of the mobile robot 20. The mobile robot 20 shown in FIG. 4 is one of the modes of the mobile robot 20, and may be in another mode. In FIG. 4, an x direction is a forward and backward direction of the mobile robot 20, a y direction is a right and left direction of the mobile robot 20, and a z direction is a height direction of the mobile robot 20.

The mobile robot 20 includes a body portion 290 and a carriage portion 260. The body portion 290 is mounted on the carriage portion 260. The body portion 290 and the carriage portion 260 each have a rectangular parallelepiped housing, and each component is mounted inside the housing. For example, the drive unit 26 is accommodated inside the carriage portion 260.

The body portion 290 is provided with the storage 291 that serves as an accommodation space and a door 292 that seals the storage 291. A plurality of shelves is provided in the storage 291, and the availability is managed for each shelf. For example, by disposing various sensors, such as a weight sensor, in each shelf, the availability can be updated. The mobile robot 20 transport the lending device in which the storage 291 is accommodated by autonomously moving to the destination as instructed by the host management device 10. The body portion 290 may mount a control box or the like (not shown) on the housing. In addition, the door 292 may be able to be lock by using an electronic key or the like. When the mobile robot 20 arrives at the transport destination, the user U2 unlocks the door 292 by using the electronic key. Alternatively, the door 292 may be automatically unlocked in a case where the mobile robot 20 arrives at the transport destination.

As shown in FIG. 4, a front and rear distance sensor 241 and a right and left distance sensor 242 are provided as the distance sensor group 24 on an exterior of the mobile robot 20. The mobile robot 20 measures the distance of the surrounding object in a front and rear direction of the mobile robot 20 by the front and rear distance sensor 241. In addition, the mobile robot 20 measures the distance of the surrounding object in the right and left direction of the mobile robot 20 by the right and left distance sensor 242.

For example, the front and rear distance sensor 241 is disposed on each of a front surface and a rear surface of the housing of the body portion 290. The right and left distance sensor 242 is disposed on each of a left side surface and a right side surface of the housing of the body portion 290. The front and rear distance sensor 241 and the right and left distance sensor 242 are, for example, an ultrasound distance sensor or a laser range finder. The front and rear distance sensor 241 and the right and left distance sensor 242 detect the distance to the surrounding object. In a case where the distance to the surrounding object detected by the front and rear distance sensor 241 or the right and left distance sensor 242 is equal to or less than the distance threshold value, the mobile robot 20 decelerates or stops.

Drive wheels 261 and casters 262 are provided in the drive unit 26. The drive wheel 261 is a wheel for causing the mobile robot 20 to move back and forth and right and left. The caster 262 is a driven wheel that rolls following the drive wheel 261 without being given a driving force. The drive unit 26 has the drive motor (not shown) and drives the drive wheels 261.

For example, the drive unit 26 supports two drive wheels 261 and two casters 262, each of which is in contact with a traveling surface, in the housing. The two drive wheels 261 are arranged such that rotation axes thereof coincide with each other. Each of the drive wheels 261 is independently rotationally driven by the motor (not shown). The drive wheels 261 are rotated in response to the control instruction value from the drive controller 212 of FIG. 2. The casters 262 are the driven wheels, have swivel shafts extending in a vertical direction from the drive unit 26 that are provided to support the wheels apart from the wheel rotation shaft, and follows a movement direction of the drive unit 26.

For example, the mobile robot 20 moves straight when the two drive wheels 261 are rotated in the same direction at the same rotation speed, and turns around a vertical axis passing through substantially the center of the two drive wheels 261 when the two drive wheels 261 are rotated in an opposite direction at the same rotation speed. In addition, by rotating the two drive wheels 261 in the same direction and at different rotation speeds, the mobile robot 20 moves while making right and left turns. For example, by setting the rotation speed of the left drive wheel 261 higher than the rotation speed of the right drive wheel 261, the mobile robot 20 can make the right turn. On the contrary, by setting the rotation speed of the right drive wheel 261 higher than the rotation speed of the left drive wheel 261, the mobile robot 20 can make the left turn. That is, the mobile robot 20 can translate, turn, and make right and left turns in any direction by controlling the rotation directions and the rotation speeds of the two drive wheels 261.

In addition, in the mobile robot 20, the display unit 27 and an operation interface 281 are provided on an upper surface of the body portion 290. The operation interface 281 is displayed on the display unit 27. By the user executing a touch operation of the operation interface 281 displayed on the display unit 27, the operation reception unit 28 can receive an instruction input from the user. In addition, an emergency stop button 282 is provided on an upper surface of the display unit 27. The emergency stop button 282 and the operation interface 281 function as the operation reception unit 28.

The display unit 27 is, for example, a liquid crystal panel, and displays a face of a character as an illustration or presents the information on the mobile robot 20 as text or an icon. By displaying the face of the character on the display unit 27, it is possible to give an impression that the display unit 27 is a pseudo face portion to a surrounding observer. The display unit 27 or the like mounted on the mobile robot 20 can be used as the user terminal 400.

The camera 25 is installed on a front surface of the body portion 290. Here, two cameras 25 function as stereo cameras. That is, the two cameras 25 having the same angle of view are disposed to be separated from each other in a horizontal direction. The image captured by each of the cameras 25 is output as image data. It is possible to calculate the distance to a subject or a size of the subject based on the image data of the two cameras 25. The operation processing unit 21 can detect a person, an obstacle, or the like in front of a traveling direction by analyzing the image of the camera 25. In a case where there is the person or the obstacle in front of the traveling direction, the mobile robot 20 moves along the route while avoiding the person or the obstacle. In addition, the image data of the camera 25 is transmitted to the host management device 10.

The mobile robot 20 recognizes the surrounding object or identifies the position of its own device by analyzing the image data output by the camera 25 and detection signals output by the front and rear distance sensor 241 and the right and left distance sensor 242. The camera 25 captures the front in the traveling direction of the mobile robot 20. As shown in FIG. 4, a side on which the camera 25 is installed as the front of own device of the mobile robot 20. That is, during normal movement, the front of own device of the mobile robot 20 is the traveling direction as indicated by an arrow.

Main Features of Present Embodiment

Next, the main features of the present embodiment in the transport system 1 having the configuration described above will be extracted and described. The main features of the present embodiment are that in a case where the mobile robot 20 cannot execute wireless communication (Wi-Fi communication and the like) with the host management device 10, the inter-robot communication (Bluetooth communication and the like) with the other mobile robot 20 is executed.

As described above, the transport system 1 according to the present embodiment can include the mobile robots 20 that autonomously travel inside the facility and the host management device 10 that manages the mobile robots 20. As described above, the host management device 10 manages the mobile robots 20 while exchanging information by wireless communication.

Figure 5:
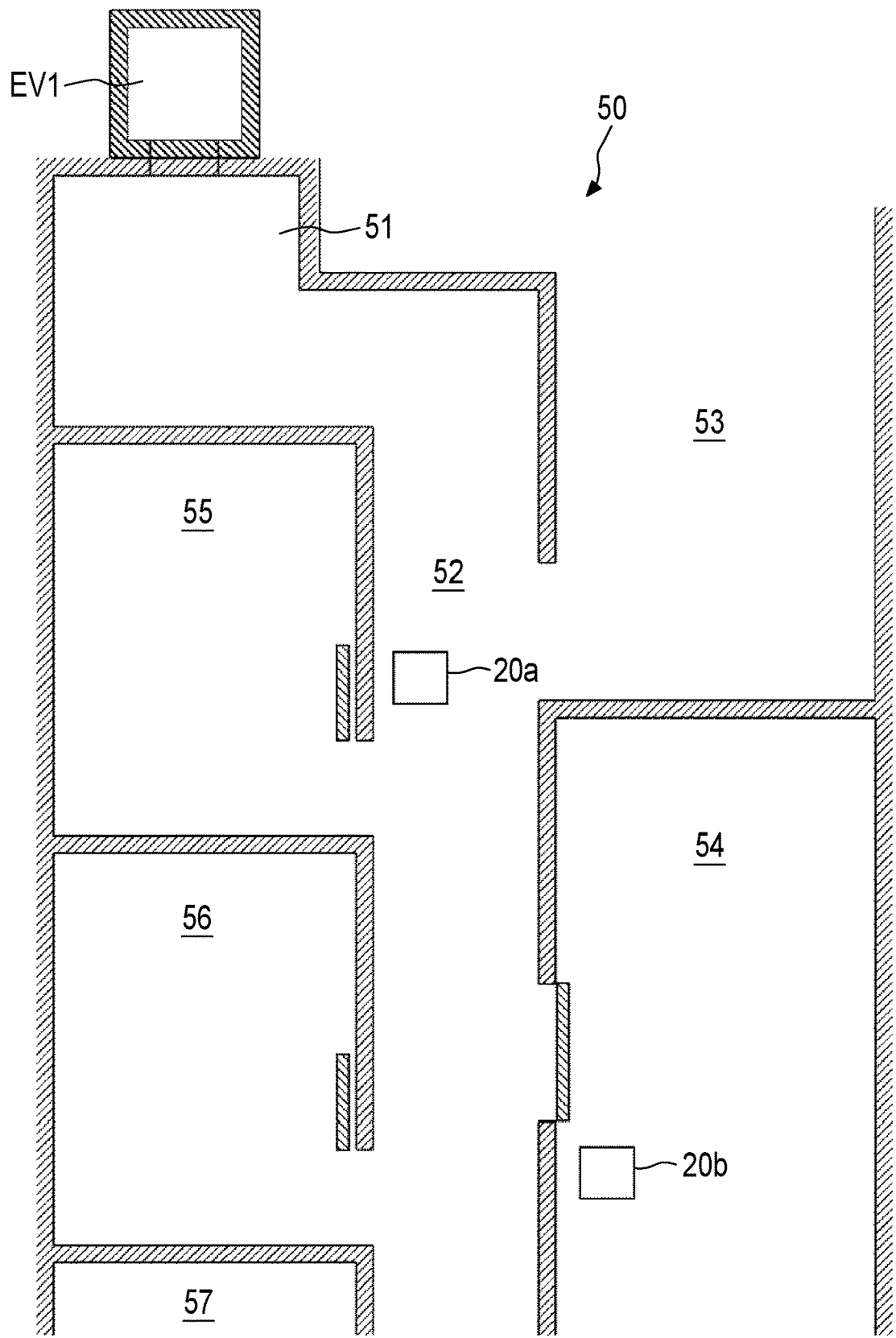
FIG. 5 is a schematic diagram showing an example of a management area managed by the facility management system of FIG. 1.

In the following, an example of the facility shown in FIG. 5 will be described. FIG. 5 is a diagram showing an example of the facility in which the mobile robot 20 autonomously moves, and is a schematic diagram showing an example of a management area managed by the facility management system 30.

The example shown in FIG. 5 shows a management area 50 set in the facility in which the mobile robot 20 that can autonomously move is operated, and includes an elevator hall 51, a passageway 52 connected to the elevator hall 51, nurse stations 53 disposed both sides of the passageway 52, and rooms (hospital rooms) 54 to 57. In the example of FIG. 5, for the sake of simplification of the description, a status is assumed that two mobile robots 20a, 20b are present as the mobile robots 20 of the management target of the host management device 10, and the inter-robot communication can be executed between the mobile robots 20a, 20b.

It is needless to say that three or more mobile robots 20 can be managed, and in such a case, the inter-robot communication may be executed for all of the mobile robots 20 that can execute communication with each other, or the mobile robot 20 may execute the inter-robot communication with solely the other mobile robot 20 that is closest (such as the other mobile robot 20 that replies the earliest).

Then, in a case where the emergency event occurs, the facility management system 30 transmits the emergency information to the host management device 10 when the emergency degree is high. In a case where the detection unit 116 detects the emergency information, or in a case where the emergency information indicating that the emergency degree is particularly high is detected, the host management device 10 can execute shutdown for the protection of its own device. In addition to the shutdown based on such a notification, the host management device 10 may also shut down due to the failure (that may be accompanied by the earthquake or the fire). When the host management device 10 shuts down, wireless communication with both the mobile robots 20a, 20b is not possible. In addition, even in a case where there is no failure in the host management device 10, wireless communication with at least one of the mobile robots 20a, 20b may be interrupted due to the failure of a part or all of a plurality of the communication units 610.

The present embodiment has main features in a process in a case where the host management device 10 interrupts wireless communication with at least one of the mobile robots 20a, 20b for some reason.

It is assumed that the mobile robot 20a receives the first transmission information (information, such as the instruction or another information) transmitted from the host management device 10 in order to manage the mobile robot 20a in a state where wireless communication with the host management device 10 is possible, and executes a drive control based on the first transmission information.

Then, in a case where wireless communication with the host management device 10 is not possible, the mobile robot 20a directly execute wireless communication (inter-robot communication) with the other mobile robot 20b and executes a reception process of receiving the first transmission information transmitted from the host management device 10 in order to manage the mobile robot 20a by the mobile robot 20b. The inter-robot communication can be executed by making the request to the mobile robot 20b in a case where the mobile robot 20a cannot execute the wireless communication with the host management device 10, but the inter-robot communication can also be executed at all times. It can be said that the inter-robot communication between the mobile robots 20a, 20b is roaming communication between the mobile robots 20a, 20b.

In a case where the reception process is executed when the host management device 10 shuts down due to the emergency event or the like, the first transmission information received by the reception process may be information received by the mobile robot 20b from the host management device 10 before the host management device 10 shuts down. As a result, even in a case where wireless communication is not possible due to the host management device 10 going down, the mobile robot 20a can receive the information needed for management.

Here, it is assumed that the mobile robot 20b is acquired in a state where communication with the host management device 10 is possible. For example, even in a status where the host management device 10 shuts down (goes down) and both the mobile robots 20a, 20b cannot execute communication with the management device 10, the first transmission information received before the above status is transmitted from the surrounding mobile robot 20b to the mobile robot 20a. With such a configuration, even in a case where wireless communication with the host management device 10 is not possible, the mobile robot 20a can receive the information (command or the like) needed for management and can continue to execute the task.

In fact, in a case where the mobile robot 20a cannot execute communication with the host management device 10 that manages the mobile robot 20a, the mobile robot 20a cannot be controlled. However, in such a case, the information or the instruction is received from the other surrounding mobile robot 20b by inter-robot communication, so that the mobile robot 20a can be controlled. As described above, in the present embodiment, since information, such as the instruction, can be received from the other mobile robot 20b, it is possible to continue to execute the instructed task even in a status where communication with the host management device 10 is not possible.

It can be said that it is useful for the mobile robot 20a to receive, also from the mobile robot 20b, the first transmission information received from the host management device 10 immediately before the interruption in order to confirm the first transmission information as the final version thereof even in a case where in the mobile robots 20a, 20b, communication with the host management device 10 is interrupted almost at the same time.

In particular, it is desirable that the mobile robot 20b receive the first transmission information together with second transmission information transmitted from the host management device 10 in order to manage the mobile robot 20b in a state where wireless communication with the host management device 10 is possible. As a result, it is possible to handle a sudden interruption of the communication between the host management device 10 and the mobile robot 20a.

In addition, since it is not known which of the mobile robots 20a, 20b cannot execute wireless communication with the host management device 10, it is preferable that the mobile robots 20a, 20b be configured to execute the same process. That is, it is preferable that the mobile robot 20a be configured to receive the second transmission information together with the first transmission information in a state where wireless communication with the host management device 10 is possible, and in a case where the mobile robot 20b cannot execute wireless communication with the host management device 10, directly execute wireless communication with the mobile robot 20b, and execute a transmission process of transmitting the second transmission information to the mobile robot 20b.

In a case where the transmission process is executed when the host management device 10 shuts down due to the emergency event or the like, the second transmission information transmitted by the transmission process may be information received from the host management device 10 before the host management device 10 shuts down. As a result, even in a case where wireless communication is not possible due to the host management device 10 going down, the mobile robot 20b can receive the information needed for management.

The mobile robot 20a or the mobile robot 20b can be configured to execute solely one of the reception process and the transmission process described above, and in such a case, the process is solely assisted by the other mobile robot or solely assists the other mobile robot.

Method

Figure 6:
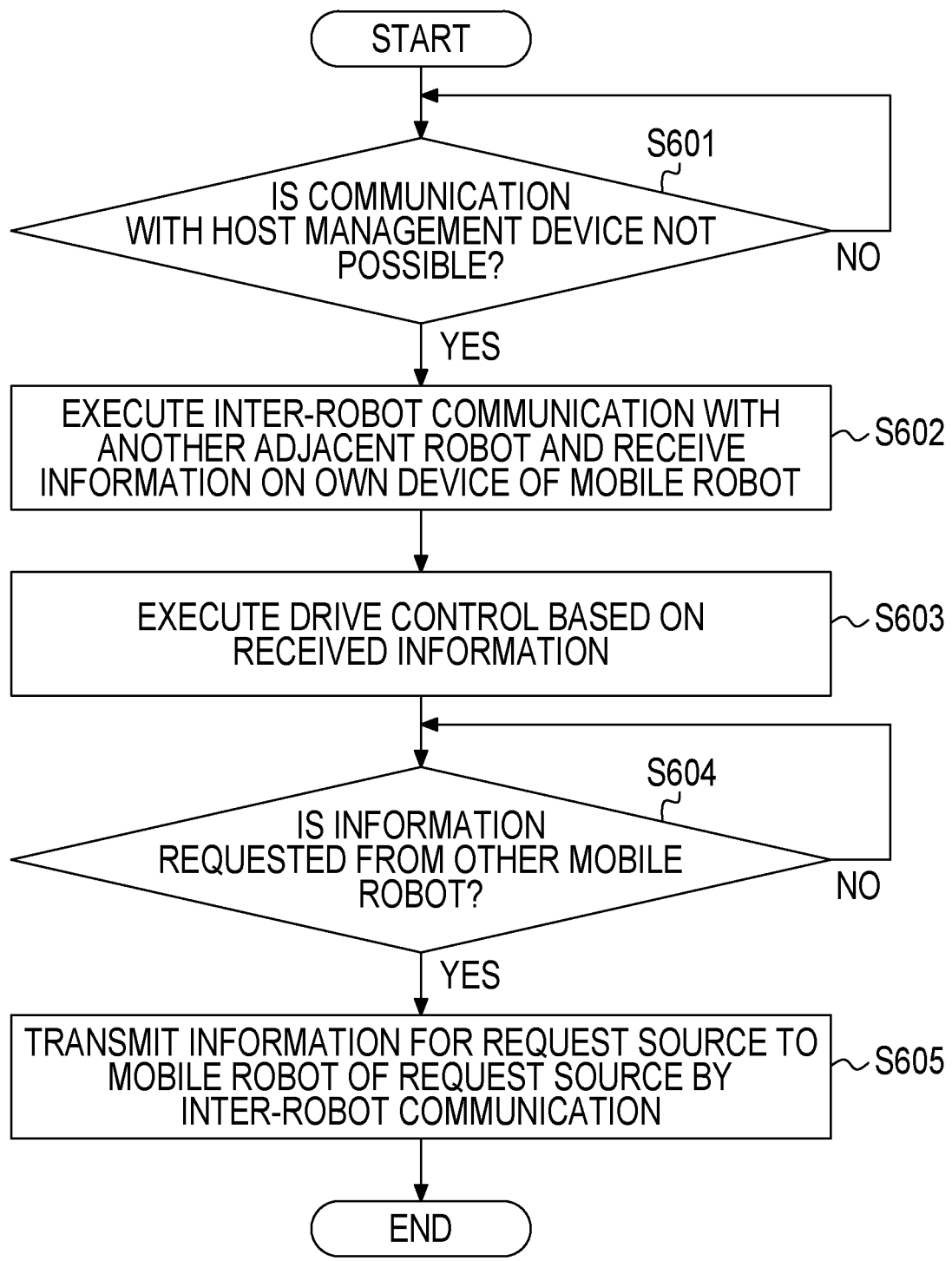
FIG. 6 is a flowchart showing an example of a method according to the present embodiment.

Among transport methods (transport processes) in the transport system 1 described above, an example of a communication method that is the main feature of the present embodiment will be described with reference to FIG. 6. FIG. 6 is a flowchart showing the method according to the present embodiment.

First, the mobile robot 20a determines whether or not wireless communication with the host management device 10 is possible (S601). At a stage where the determination in step S601 is YES, the mobile robot 20a executes the inter-robot communication with the other adjacent mobile robot 20b and receives the first transmission information for its own device (S602). The mobile robot 20*a* executes the drive control based on the received first transmission information (S603).

Next, the mobile robot 20*a* determines whether or not a request for the information (command from the host management device 10 or the like) receives from the other mobile robot 20*b* (may be different from the mobile robot 20*b* in S602) (S604). At a stage where the determination in step S604 is YES, the mobile robot 20*a* transmits the information for a request source to mobile robot 20*b* of the request source by the inter-robot communication (S605), and terminates the process. The drive control will continue to be executed in the mobile robot 20*b* of the request source by step S605.

Other Process Examples

Next, another process example in the transport system 1 will be described with reference to FIG. 7. FIG. 7 is a flowchart showing another example of the method according to the present embodiment.

First, in a case where wireless communication with the host management device 10 is not possible (in a case of YES in S701) as in steps S601 to S603 of FIG. 6, the mobile robot 20*a* receives the first transmission information from the mobile robot 20*b* and executes the drive control based on the first transmission information (S702).

Next, the mobile robot 20*a* transmits the state information (own device state information 227) stored in a case where the mobile robot 20*a* cannot execute wireless communication with the host management device 10 to the mobile robot 20*b* by the inter-robot communication (S703). It is needless to say that the own device state information 227 is not limited to the example described above, can include various types of information treated by the mobile robot 20*a*, and for example, can also include information indicating the operation received by the mobile robot 20*a* from the operation reception unit 28 or the like or the process executed in response to the operation. Note that in order to execute later search in the host management device 10, it is desirable that the transmitted own device state information 227 include the positional information indicating the position of own device (mobile robot 20*a*) such that the search can be executed after restoring even in a case where the host management device 10 shuts down, for example. In addition, from a viewpoint of an amount of information, it can be said that it is desirable that the minimum amount of information to be left be transmitted as such own device state information 227.

The mobile robot 20*b* transmits the own device state information 227 of the mobile robot 20*a* received in step S703 to the host management device 10 in a state where wireless communication with the host management device 10 is possible (in a case where the state of the mobile robot 20*b* is not the above state, when the state thereof reaches the above state). As a result, the host management device 10 can manage the state of the mobile robot 20*a* that cannot execute wireless communication (execute the search when the positional information is included).

Next, the mobile robot 20*a* determines whether or not a request for the information (command from the host management device 10 or the like) receives from the other mobile robot 20*b* (may be different from the mobile robot 20*b* in S702) (S704). At a stage where the determination in step S704 is YES, the mobile robot 20*a* transmits the information for the request source to mobile robot 20*b* of the request source by the inter-robot communication (S705) as in step S605. The drive control will continue to be executed in the mobile robot 20*b* of the request source by step S705.

Next, the mobile robot 20*a* receives the state information (own device state information 227) stored in a case where the mobile robot 20*b* cannot execute wireless communication with the host management device 10 from the mobile robot 20*b* by the inter-robot communication and store the received state information in the storage unit 22 as the other device state information 228 (S706). The received own device state information 227 is the state information of the mobile robot 20*b*, and can have the same content as the own device state information 227 transmitted in step S703, for example.

Next, the mobile robot 20*a* determines whether or not wireless communication with the host management device 10 is possible (S707). At a stage where the determination in step S707 is YES, the mobile robot 20*a* transmits the other device state information 228 (own device state information 227 of the mobile robot 20*a*) received and stored in step S706 to the host management device 10 in a state where wireless communication with the host management device 10 is possible (in a case where the state of the mobile robot 20*a* is not the above state, when the state thereof reaches the above state) (S708), and terminates the process. As a result, the host management device 10 can manage the state of the mobile robot 20*b* that cannot execute wireless communication (execute the search when the positional information is included).

By the process of the mobile robot 20*b* and the process of step S708 after step S703, the host management device 10 can obtain the state information of the mobile robots 20*a*, 20*b* that cannot execute wireless communication, respectively. As a result, the host management device 10 can continue to manage (control) the mobile robots 20*a*, 20*b* that cannot execute wireless communication, respectively, and can be operated again even in a case where the host management device 10 is stopped in an emergency, for example.

In particular, when the positional information is included in the state information, the host management device 10 can search for the mobile robots 20*a*, 20*b* based on the received positional information even when the mobile robots 20*a*, 20*b* that cannot be execute wireless communication, respectively, are lost. Further, the host management device 10 can also execute a control, such as designing the route again, by using the search result and a part or all of the state information other than the positional information. In addition, it is not needed to install an RFID or a landmark in the facility for the search.

Others

In addition, a part or all of the processes in the host management device 10 described above, the mobile robot 20, the facility management system 30, and the like can be realized as a computer program. Such a program can be stored by using various types of non-transitory computer-readable media and supplied to a computer. The non-transitory computer-readable media include various types of tangible recording media. Examples of the non-transitory computer-readable medium include a magnetic recording medium (for example, a flexible disk, a magnetic tape, or a hard disk drive), a magneto-optical recording medium (for example, a magneto-optical disk), CD-Read Only Memory (ROM), CD-R, CD-R/W, and a semiconductor memory (for example, a mask a ROM, a programmable ROM (PROM), an erasable PROM (EPROM), a flash ROM, or a random access memory (RAM)). In addition, the program may also be supplied to the computer by various types of transitory computer-readable media. Examples of the transitory computer-readable medium include an electric signal, an optical signal, and an electromagnetic wave. The transitory-computer readable medium can supply the program to the computer via a wired communication channel, such as an electric wire and an optical fiber, or a wireless communication channel.

The present disclosure is not limited to the embodiments described above, and can be appropriately modified without departing from the spirit.

For example, in the embodiments described above, the system has been mainly described in which the mobile robot autonomously moves inside the hospital, but the transport system described above can also transport the transport object in a hotel, a restaurant, an office building, an event venue, a complex facility, or the like. In addition, although the description has been made on the assumption that the transport object is transported inside one facility, when the mobile robot can move between a plurality of facilities, the mobile robot can be similarly applied to the transport between the facilities. In addition, the transport system according to the present embodiment is not limited to a case where the mobile robot 20 having the configuration described above is used, and instead of or in addition to the mobile robot 20, the mobile robots having various configurations can be used.

In addition, in the embodiments described above, the mobile robot (that is, the transport robot) or the transport system in the transport system that transports the transport object has been described. However, the same idea can be applied to another mobile robot, such as a surveillance robot that can autonomously moves, and a management system (control system) that manages the other mobile robots.

What is claimed is:

1. A mobile robot in a transport system including a server device configured to exchange information with a plurality of the mobile robots that is autonomously movable inside a facility by wireless communication and manage the mobile robots and transporting a transport object by using the mobile robots, wherein the mobile robot is configured to
receive first transmission information transmitted from the server device to manage the mobile robot in a state where wireless communication with the server device is possible, and
directly execute wireless communication with another mobile robot among the mobile robots and execute a reception process of receiving the first transmission information transmitted from the server device to manage the mobile robot from the other mobile robot in a case where wireless communication with the server device is not possible;
wherein the mobile robot is configured to:
receive the first transmission information and second transmission information transmitted from the server device to manage the other mobile robot in a state where wireless communication with the server device is possible,
directly execute wireless communication with the other mobile robot and execute a transmission process of transmitting the second transmission information to the other mobile robot in a case where wireless communication of the other mobile robot with the server device is not possible,
receive the first transmission information and second transmission information transmitted from the server device to manage the other mobile robot in a state where wireless communication with the server device is possible, and
directly execute wireless communication with the other mobile robot and execute a transmission process of transmitting the second transmission information to the other mobile robot in a case where wireless communication of the other mobile robot with the server device is not possible; and
wherein:
the reception process is executed in a case where the server device shuts down; and
the first transmission information received in the reception process is information received by the other mobile robot from the server device before the server device shuts down.

2. The mobile robot according to claim 1, wherein the mobile robot is configured to transmit state information indicating a state of the other mobile robot to the server device, the state information being transmitted from the other mobile robot, in a state where wireless communication with the server device is possible in a case where wireless communication of the other mobile robot with the server device is not possible.

3. A mobile robot in a transport system including a server device configured to exchange information with a plurality of the mobile robots that is autonomously movable inside a facility by wireless communication and manage the mobile robots and transporting a transport object by using the mobile robots, wherein the mobile robot is configured to
receive first transmission information transmitted from the server device to manage the mobile robot and second transmission information transmitted from the server device to manage another mobile robot among the mobile robots in a state where wireless communication with the server device is possible, and
directly execute wireless communication with the other mobile robot and execute a transmission process of transmitting the second transmission information to the other mobile robot in a case where wireless communication of the other mobile robot with the server device is not possible;
wherein the mobile robot is configured to:
receive the first transmission information and second transmission information transmitted from the server device to manage the other mobile robot in a state where wireless communication with the server device is possible,
directly execute wireless communication with the other mobile robot and execute a transmission process of transmitting the second transmission information to the other mobile robot in a case where wireless communication of the other mobile robot with the server device is not possible,
receive the first transmission information and second transmission information transmitted from the server device to manage the other mobile robot in a state where wireless communication with the server device is possible, and
directly execute wireless communication with the other mobile robot and execute a transmission process of transmitting the second transmission information to the other mobile robot in a case where wireless communication of the other mobile robot with the server device is not possible; and
wherein:
the reception process is executed in a case where the server device shuts down; and the first transmission information received in the reception process is information received by the other mobile robot from the server device before the server device shuts down.

4. A transport system comprising a server device configured to exchange information with a plurality of mobile robots that is autonomously movable inside a facility by wireless communication and manage the mobile robots, wherein:
the transport system transports a transport object by using the mobile robots;
the mobile robot is configured to receive first transmission information transmitted from the server device to manage the mobile robot and second transmission information transmitted from the server device to manage another mobile robot among the mobile robots in a state where wireless communication with the server device is possible;
the other mobile robot is configured to receive the first transmission information and the second transmission information in a state where wireless communication with the server device is possible;
the mobile robot is configured to directly execute wireless communication with the other mobile robot, receive the first transmission information from the other mobile robot, and execute a first communication process of transmitting first positional information indicating a position of the mobile robot to the other mobile robot in a case where wireless communication with the server device is not possible;
the other mobile robot is configured to directly execute wireless communication with the mobile robot, receive the second transmission information from the mobile robot, and execute a second communication process of transmitting second positional information indicating a position of the other mobile robot to the mobile robot in a case where wireless communication with the server device is not possible;
the other mobile robot is configured to transmit the first positional information received in the first communication process to the server device in a state where wireless communication with the server device is possible;
the mobile robot is configured to transmit the second positional information received in the second communication process to the server device in a state where wireless communication with the server device is possible; and
the server device is configured to
search for the mobile robot based on the first positional information in a case where wireless communication with the mobile robot is not possible, and search for the other mobile robot based on the second positional information in a case where wireless communication with the other mobile robot is not possible;
wherein the mobile robot is configured to:
receive the first transmission information and second transmission information transmitted from the server device to manage the other mobile robot in a state where wireless communication with the server device is possible,
execute a transmission process of transmitting the second transmission information to the other mobile robot in a case where wireless communication of the other mobile robot with the server device is not possible,
receive the second transmission information transmitted from the server device to manage the other mobile robot in a state where wireless communication with the server device is possible, and
directly execute wireless communication with the other mobile robot and execute a transmission process of transmitting the second transmission information to the other mobile robot in a case where wireless communication of the other mobile robot with the server device is not possible; and
wherein:
the reception process is executed in a case where the server device shuts down; and
the first transmission information received in the reception process is information received by the other mobile robot from the server device before the server device shuts down.

5. A method for a mobile robot in a transport system including a server device configured to exchange information with a plurality of the mobile robots that is autonomously movable inside a facility by wireless communication and manage the mobile robots and transporting a transport object by using the mobile robots, the method comprising:
causing the mobile robot to receive first transmission information transmitted from the server device to manage the mobile robot in a state where wireless communication with the server device is possible; and
causing the mobile robot to directly execute wireless communication with another mobile robot among the mobile robots and execute a reception process of receiving the first transmission information transmitted from the server device to manage the mobile robot from the other mobile robot in a case where wireless communication with the server device is not possible;
wherein:
the mobile robot receives the first transmission information and second transmission information transmitted from the server device to manage the other mobile robot in a state where wireless communication with the server device is possible;
the mobile robot directly executes wireless communication with the other mobile robot and executes a transmission process of transmitting the second transmission information to the other mobile robot in a case where wireless communication of the other mobile robot with the server device is not possible;
the transmission process is executed in a case where the server device shuts down;
the second transmission information transmitted in the transmission process is information received from the server device before the server device shuts down;
the reception process is executed in a case where the server device shuts down; and
the first transmission information received in the reception process is information received by the other mobile robot from the server device before the server device shuts down.

6. The method according to claim 5, wherein the mobile robot transmits state information indicating a state of the other mobile robot to the server device, the state information being transmitted from the other mobile robot, in a state where wireless communication with the server device is possible in a case where wireless communication of the other mobile robot with the server device is not possible.

7. A method for a mobile robot in a transport system including a server device configured to exchange information with a plurality of the mobile robots that is autonomously movable inside a facility by wireless communication and manage the mobile robots and transporting a transport object by using the mobile robots, the method comprising:

causing the mobile robot to receive first transmission information transmitted from the server device to manage the mobile robot and second transmission information transmitted from the server device to manage another mobile robot among the mobile robots in a state where wireless communication with the server device is possible; and causing the mobile robot to directly execute wireless communication with the other mobile robot and execute a transmission process of transmitting the second transmission information to the other mobile robot in a case where wireless communication of the other mobile robot with the server device is not possible;

wherein:

the mobile robot receives the first transmission information and second transmission information transmitted from the server device to manage the other mobile robot in a state where wireless communication with the server device is possible;

the mobile robot directly executes wireless communication with the other mobile robot and executes a transmission process of transmitting the second transmission information to the other mobile robot in a case where wireless communication of the other mobile robot with the server device is not possible;

the transmission process is executed in a case where the server device shuts down;

the second transmission information transmitted in the transmission process is information received from the server device before the server device shuts down;

the reception process is executed in a case where the server device shuts down; and the first transmission information received in the reception process is information received by the other mobile robot from the server device before the server device shuts down.

8. A method for a server device in a transport system including the server device configured to exchange information with a plurality of mobile robots that is autonomously movable inside a facility by wireless communication and manage the mobile robots and transporting a transport object by using the mobile robots, the method comprising:

causing the mobile robot to receive first transmission information transmitted from the server device to manage the mobile robot and second transmission information transmitted from the server device to manage another mobile robot among the mobile robots in a state where wireless communication with the server device is possible;

causing the other mobile robot to receive the first transmission information and the second transmission information in a state where wireless communication with the server device is possible;

causing the mobile robot directly to execute wireless communication with the other mobile robot, receives the first transmission information from the other mobile robot, and execute a first communication process of transmitting first positional information indicating a position of the mobile robot to the other mobile robot in a case where wireless communication with the server device is not possible;

causing the other mobile robot to directly execute wireless communication with the mobile robot, receive the second transmission information from the mobile robot, and execute a second communication process of transmitting second positional information indicating a position of the other mobile robot to the mobile robot in a case where wireless communication with the server device is not possible;

causing the server device to receive the first positional information received in the first communication process by the other mobile robot from the other mobile robot in a state where wireless communication with the other mobile robot is possible;

causing the server device to receive the second positional information received in the second communication process by the mobile robot from the mobile robot in a state where wireless communication with the mobile robot is possible;

causing the server device to search for the mobile robot based on the first positional information in a case where wireless communication with the mobile robot is not possible; and causing the server device to search for the other mobile robot based on the second positional information in a case where wireless communication with the other mobile robot is not possible;

wherein:

the mobile robot receives the first transmission information and second transmission information transmitted from the server device to manage the other mobile robot in a state where wireless communication with the server device is possible;

the mobile robot executes a transmission process of transmitting the second transmission information to the other mobile robot in a case where wireless communication of the other mobile robot with the server device is not possible;

the transmission process is executed in a case where the server device shuts down;

the second transmission information transmitted in the transmission process is information received from the server device before the server device shuts down;

the reception process is executed in a case where the server device shuts down; and the first transmission information received in the reception process is information received by the other mobile robot from the server device before the server device shuts down.

9. A non-transitory computer-readable medium storing a program causing a computer mounted on a mobile robot to execute a communication process in a transport system including a server device configured to exchange information with a plurality of the mobile robots that is autonomously movable inside a facility by wireless communication and manage the mobile robots and transporting a transport object by using the mobile robots, wherein the communication process includes receiving first transmission information transmitted from the server device to manage the mobile robot in a state where wireless communication with the server device is possible, and directly executing wireless communication with another mobile robot among the mobile robots and executing a reception process of receiving the first transmission information transmitted from the server device to manage the mobile robot from the other mobile robot in a case where wireless communication with the server device is not possible;

wherein the communication process includes:
receiving the first transmission information and second transmission information transmitted from the server device to manage the other mobile robot in a state where wireless communication with the server device is possible, and directly executing wireless communication with the other mobile robot and executing a transmission process of transmitting the second transmission information to the other mobile robot in a case where wireless communication of the other mobile robot with the server device is not possible;

wherein:
the transmission process is executed in a case where the server device shuts down;
the second transmission information transmitted in the transmission process is information received from the server device before the server device shuts down;
the reception process is executed in a case where the server device shuts down; and
the first transmission information received in the reception process is information received by the other mobile robot from the server device before the server device shuts down.

10. The computer-readable medium according to claim 9, wherein the communication process includes transmitting state information indicating a state of the other mobile robot to the server device, the state information being transmitted from the other mobile robot, in a state where wireless communication with the server device is possible in a case where wireless communication of the other mobile robot with the server device is not possible.

11. A non-transitory computer-readable medium storing a program causing a computer mounted on a mobile robot to execute a communication process in a transport system including a server device configured to exchange information with a plurality of the mobile robots that is autonomously movable inside a facility by wireless communication and manage the mobile robots and transporting a transport object by using the mobile robots, wherein the communication process includes receiving first transmission information transmitted from the server device to manage the mobile robot and second transmission information transmitted from the server device to manage another mobile robot among the mobile robots in a state where wireless communication with the server device is possible, and directly executing wireless communication with the other mobile robot and executing a transmission process of transmitting the second transmission information to the other mobile robot in a case where wireless communication of the other mobile robot with the server device is not possible;

wherein the communication process includes:
receiving the first transmission information and second transmission information transmitted from the server device to manage the other mobile robot in a state where wireless communication with the server device is possible, and directly executing wireless communication with the other mobile robot and executing a transmission process of transmitting the second transmission information to the other mobile robot in a case where wireless communication of the other mobile robot with the server device is not possible;

wherein:
the transmission process is executed in a case where the server device shuts down;
the second transmission information transmitted in the transmission process is information received from the server device before the server device shuts down;
the reception process is executed in a case where the server device shuts down; and
the first transmission information received in the reception process is information received by the other mobile robot from the server device before the server device shuts down.

12. A non-transitory computer-readable medium storing a program causing a server computer to execute a management process in a transport system including the server computer configured to exchange information with a plurality of mobile robots that is autonomously movable inside a facility by wireless communication and manage the mobile robots and transporting a transport object by using the mobile robots, the program causing the server computer to execute:

causing the mobile robot to receive first transmission information transmitted from the server computer to manage the mobile robot and second transmission information transmitted from the server computer to manage another mobile robot among the mobile robots in a state where wireless communication with the server computer is possible;

causing the other mobile robot to receive the first transmission information and the second transmission information in a state where wireless communication with the server computer is possible;

causing the mobile robot to directly execute wireless communication with the other mobile robot, receive the first transmission information from the other mobile robot, and execute a first communication process of transmitting first positional information indicating a position of the mobile robot to the other mobile robot in a case where wireless communication with the server computer is not possible;

causing the other mobile robot to directly execute wireless communication with the mobile robot, receive the second transmission information from the mobile robot, and execute a second communication process of transmitting second positional information indicating a position of the other mobile robot to the mobile robot in a case where wireless communication with the server computer is not possible; and the management process includes
receiving the first positional information received in the first communication process by the other mobile robot from the other mobile robot in a state where wireless communication with the other mobile robot is possible,
receiving the second positional information received in the second communication process by the mobile robot from the mobile robot in a state where wireless communication with the mobile robot is possible,
executing searching for the mobile robot based on the first positional information in a case where wireless communication with the mobile robot is not possible, and
executing searching for the other mobile robot based on the second positional information in a case where wireless communication with the other mobile robot is not possible;

wherein the communication process includes:
　　receiving the first transmission information and second transmission information transmitted from the server device to manage the other mobile robot in a state where wireless communication with the server device is possible, and
　　executing a transmission process of transmitting the second transmission information to the other mobile robot in a case where wireless communication of the other mobile robot with the server device is not possible;
wherein:
　　the transmission process is executed in a case where the server device shuts down;
　　the second transmission information transmitted in the transmission process is information received from the server device before the server device shuts down;
　　the reception process is executed in a case where the server device shuts down; and
　　the first transmission information received in the reception process is information received by the other mobile robot from the server device before the server device shuts down.

\* \* \* \* \*